United States Patent
Kim et al.

(10) Patent No.: US 12,000,529 B2
(45) Date of Patent: Jun. 4, 2024

(54) DISPLAY APPARATUS

(71) Applicant: SAMSUNG ELECTRONICS CO., LTD., Suwon-si (KR)

(72) Inventors: Heebong Kim, Suwon-si (KR); Dianaminsun Kang, Suwon-si (KR); Kyounghwan Kim, Suwon-si (KR); Boumsik Kim, Suwon-si (KR); Seunghwan Song, Suwon-si (KR); Jinyoung Shin, Suwon-si (KR); Minhee Lee, Suwon-si (KR); Hosuk Chae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 507 days.

(21) Appl. No.: 17/230,322

(22) Filed: Apr. 14, 2021

(65) Prior Publication Data
US 2021/0317945 A1    Oct. 14, 2021

(30) Foreign Application Priority Data

Apr. 14, 2020 (KR) .................. 10-2020-0045207

(51) Int. Cl.
*F16M 11/22* (2006.01)
*G06F 1/18* (2006.01)

(52) U.S. Cl.
CPC .............. *F16M 11/22* (2013.01); *G06F 1/181* (2013.01)

(58) Field of Classification Search
CPC .............. F16M 11/02–18; G06F 1/1601; G06F 1/1607
USPC .................................................. 248/919–923
See application file for complete search history.

(56) References Cited

U.S. PATENT DOCUMENTS

| | | | |
|---|---|---|---|
| 2002/0093483 A1* | 7/2002 | Kaplan | G06F 1/1626 345/158 |
| 2006/0290832 A1 | 12/2006 | Lin et al. | |
| 2007/0080270 A1 | 4/2007 | Choi | |
| 2008/0223998 A1 | 9/2008 | Bang et al. | |
| 2017/0155869 A1 | 6/2017 | Ikemoto et al. | |

FOREIGN PATENT DOCUMENTS

| | | |
|---|---|---|
| CN | 105782668 A | 7/2016 |
| JP | 2011-170356 A | 9/2011 |
| JP | 2018-152690 A | 9/2018 |
| KR | 10-0830428 B1 | 5/2008 |
| KR | 10-2018-0056062 A | 5/2018 |
| KR | 10-2020-0025276 A | 3/2020 |
| WO | 2020/137333 A1 | 7/2020 |

OTHER PUBLICATIONS

International Search Report dated Jul. 23, 2021 issued by the International Searching Authority in counterpart International Application No. PCT/KR2021/004363 (PCT/ISA/210).

* cited by examiner

*Primary Examiner* — Adrian S Wilson
(74) *Attorney, Agent, or Firm* — Sughrue Mion, PLLC

(57) ABSTRACT

Disclosed is a display apparatus including a display assembly comprising a screen configured to display an image; and a stand connected to the display assembly to support the display assembly. The stand comprises a support bar extending in a front-rear direction, a leg extending upward from the support bar, and a plurality of coupling parts provided on the leg and arranged in the front-rear direction. The display assembly is connected to one of the plurality of coupling parts.

20 Claims, 18 Drawing Sheets

US 12,000,529 B2

DISPLAY APPARATUS

CROSS-REFERENCE TO RELATED APPLICATION(S)

This application is based on and claims priority under 35 U.S.C. § 119 to Korean Patent Application No. 10-2020-0045207, filed on Apr. 14, 2020, in the Korean Intellectual Property Office, the disclosure of which is incorporated by reference herein in its entirety.

BACKGROUND

1. Field

The disclosure relates to a display apparatus, and more particularly, to a display apparatus having a stand.

2. Description of Related Art

In general, a display apparatus is a device for displaying an image, such as a monitor or a television. A self-light emitting display panel, such as an organic light-emitting diode (OLED), or a light-receiving/emitting display panel, such as a liquid crystal display (LCD) panel, is used in a display apparatus.

A display apparatus may be mounted on a wall or mounted on the floor using a stand according to a users preference.

SUMMARY

It is an aspect of the disclosure to provide a display apparatus including a stand providing variously mounted states of a display assembly.

It is an aspect of the disclosure to provide a display apparatus including a stand for mounting a display assembly that provides different content depending on mounting states.

Additional aspects of the disclosure will be set forth in part in the description which follows and, in part, will be obvious from the description, or may be learned by practice of the disclosure.

According to an aspect of the disclosure, a display apparatus includes a display assembly comprising a screen configured to display an image; and a stand connected to the display assembly to support the display assembly. The stand comprises a support bar extending in a front-rear direction, a leg extending upward from the support bar, and a plurality of coupling parts provided on the leg and arranged in the front-rear direction. The display assembly is connected to one of the plurality of coupling parts.

Each of the plurality of coupling parts may include a coupling surface on which the display assembly is disposed, and the display assembly may be disposed on a respective coupling surface such that the respective coupling surface and a screen of the display assembly are parallel to each other.

The plurality of coupling parts may include a first coupling part comprising a first coupling surface provided on a first surface of the leg, and a second coupling part comprising a second coupling surface provided on a second surface of the leg and having an upper end inclined toward the first surface of the leg.

A rear surface of the display assembly may be connected to the first coupling part and disposed on the first coupling surface, and the screen of the display assembly may be disposed vertically in the front-rear direction.

A rear surface of the display assembly may be connected to the second coupling part and disposed on the second coupling surface, and the screen of the display assembly may be disposed such that an upper end of the screen is inclined downward.

The support bar may include a central portion from which the leg extends, a first extension portion extending from a first end of the central portion, and a second extension portion extending from the a second end of the central portion and that is shorter than the first extension portion, and the leg may be formed such that an upper end of the leg is inclined in a direction in which the first extension portion extends.

The first coupling part may be provided at an upper portion of the leg and is positioned above the first extension portion, and the first extension portion may protrude toward a front of the display assembly when the display assembly is connected to the first coupling part.

The second coupling part may be provided at an upper portion of the leg and may be positioned above the central portion, and the first extension portion may protrude toward the rear of the display assembly when the display assembly is connected to the second coupling part.

The first coupling part may include a first hook provided on the first coupling surface and a first screw coupling portion provided on the first coupling surface, and the second coupling part may include a second hook provided on the second coupling surface and a second screw coupling portion provided on the second coupling surface.

The display assembly may include a screw fastening portion provided on a rear surface of the display assembly to connect with the first screw coupling portion or the second screw coupling portion The display assembly may include a first hook coupling portion provided on a rear surface of the display assembly to connect to the first hook, and a second hook coupling portion provided on the rear surface of the display assembly to connect to the second hook.

The first hook coupling portion may be provided to be spaced apart from the screw fastening portion by a first distance in a direction perpendicular to a long side of the display assembly.

The second hook coupling portion may be provided to be spaced apart from the screw fastening portion by a second distance longer than the first distance in a direction perpendicular to the long side of the display assembly.

The screw fastening portion, the first hook coupling portion, and the second hook coupling portion may be arranged side by side in a direction perpendicular to the long side of the display assembly.

The second hook coupling portion may be disposed to be spaced apart from the screw fastening portion by a second distance in a direction perpendicular to a short side of the display assembly.

A display apparatus may include a display assembly comprising a screen configured to display an image; a stand connected to the display assembly to support the display assembly; a sensor to detect a tilt of the display assembly; and a controller configured to change an input source of an image output via the screen of the display assembly based on the tilt of the display assembly. The stand may include a support bar extending in a front-rear direction, a leg extending upward from the support bar, and a plurality of coupling parts provided on the leg and arranged in the front-rear direction. The display assembly may be connected to one of the plurality of coupling parts.

The plurality of coupling parts may include a first coupling part comprising a first coupling surface provided on a first surface of the leg perpendicular to a ground, and a second coupling part comprising a second coupling surface provided on a second surface of the leg and having an upper end inclined toward the first surface of the leg, and the controller is further configured to change the input source to a television mode based on determining that the display assembly is connected to the first coupling part, and change the input source to a content mode for receiving preset content based on determining that the display assembly is connected to the second coupling part.

The controller is further configured to control the display assembly to display a list of the preset content based on determining that the display assembly is connected to the second coupling part.

The controller is further configured to change the input source to a phone mode for interworking with a user terminal based on determining that the display assembly is connected to the second coupling part and a short side of the display assembly is horizontal to a ground surface.

The controller is further configured to determine that the preset content is content having an aspect ratio in which a vertical side is larger than a horizontal side based on determining that the display assembly is connected to the second coupling part and a short side of the display assembly is horizontal to a ground surface.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Configurations shown in the embodiments and the drawings described in the present specification are examples of embodiments of the present disclosure, and thus it is to be understood that various modified examples, which may replace the embodiments and the drawings described in the present specification, are possible when filing the present application.

Like reference numbers or signs in the various figures of the application represent parts or components that perform substantially the same functions.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that although the terms "first," "second," etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

The terms "front end," "rear end," "upper portion," "lower portion," "upper end," and "lower end" used in the following description are defined with reference to the drawings, and the shape and position of each component are not limited by these terms.

Hereinafter, embodiments of the disclosure will be described in detail with reference to the accompanying drawings.

Figure 1:
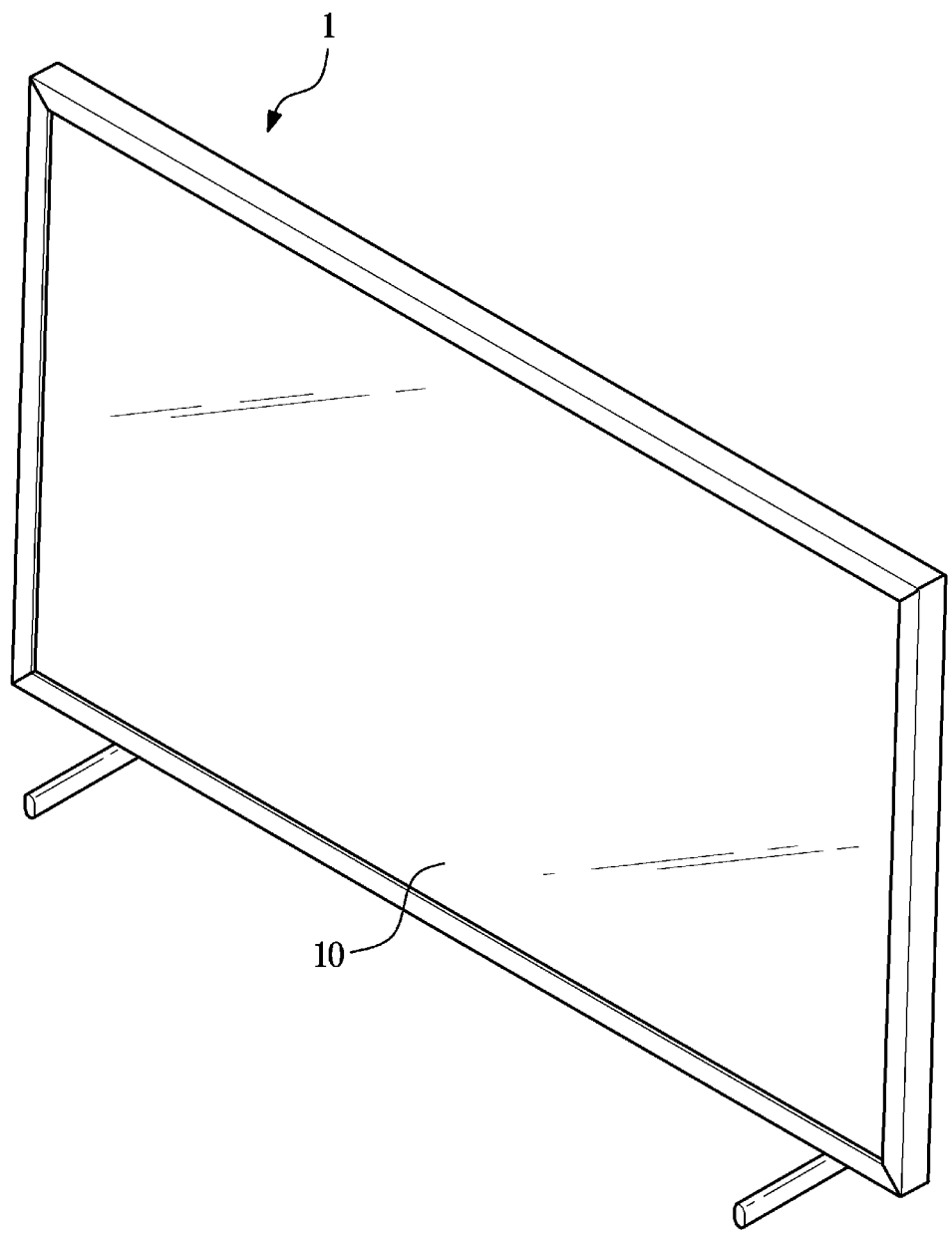
FIG. 1 is a perspective view of a display apparatus according to an embodiment of the disclosure.
Figure 2:
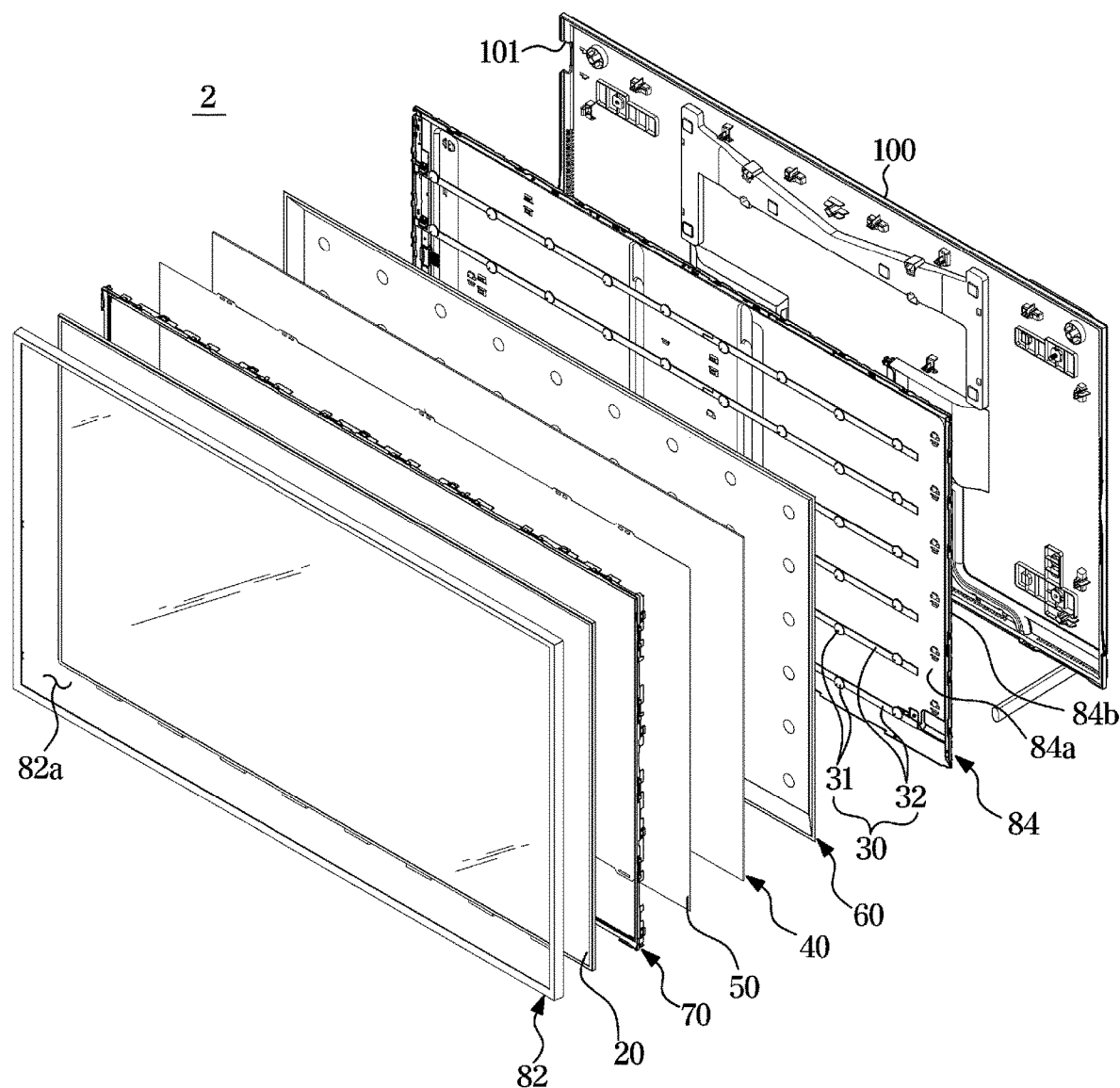
FIG. 2 is an exploded view of a display assembly of the display apparatus illustrated in FIG. 1.

FIG. 1 is a perspective view of a display apparatus according to an embodiment of the disclosure, and FIG. 2 is an exploded view of a display assembly of the display apparatus illustrated in FIG. 1.

The disclosure describes a flat display apparatus as an example, but may be applied to a curved display apparatus or a bendable display apparatus.

Referring to FIGS. 1 and 2, a display apparatus 1 may include a display assembly 2 including a screen 10 for displaying an image in front thereof. The display assembly 2 may have a rectangular shape in which an upper or lower side corresponding to a horizontal side of a front or rear surface is longer than a left or right side corresponding to a vertical side thereof, when viewed from a front-rear direction. Accordingly, the upper and lower sides corresponding to the horizontal side of the front or rear surface of the display assembly 2 may be referred to as a long side L (see FIG. 5), and the side corresponding to the vertical side thereof may be referred to as a short side S (see FIG. 5).

The display assembly 2 may include a chassis assembly configured to accommodate and support a display panel 20 and a backlight unit.

The display panel 20 may be formed as a liquid crystal panel formed by sealing a liquid crystal between two glass substrates each provided with an electrode, and may display an image in front thereof. Accordingly, the screen 10 of the display assembly 2 may correspond to an area exposed to the outside of the display panel 20.

The chassis assembly may include a top chassis 82, a middle mold 70, and a bottom chassis 84.

The top chassis 82 may include an opening 82*a* to expose the display panel 20. The bottom chassis 84 may include a bottom portion 84*a* disposed below the backlight unit and a bottom side portion 84*b* extending upward from the bottom portion 84*a*.

Various components of the display apparatus 1 such as the top chassis 82 and the middle mold 70 may be fixedly supported on the bottom chassis 84.

The bottom chassis 84 may perform a function of radiating heat generated from a light source 31 to the outside. That is, heat generated from the light source 31 may be transferred to the bottom chassis 84 via a printed circuit board 32 and may be radiated from the bottom chassis 84. To this end, the bottom chassis 84 may be made of various metal materials such as aluminum and stainless steel having excellent thermal conductivity, or plastic materials such as ABS. A metal PCB made of aluminum having excellent thermal conductivity may also be used for the printed circuit board 32.

However, the disclosure is not limited thereto, and at least one of the top chassis 82, the middle mold 70, and the bottom chassis 84 may be removed or may be integrally formed with each other.

The display assembly 2 may further include a rear cover 100 configured to surround the chassis assembly and cover the rear of the bottom chassis 84 to protect and accommodate the chassis assembly described above.

The display assembly 2 may further include the backlight unit provided to supply light to the display panel 20.

The backlight unit may be a direct type in which the light source 31 is disposed directly below the display panel 20. The backlight unit may include a light source module 30 including the light source 31 and the printed circuit board 32 on which the light source 31 is mounted, and various optical sheets 50 disposed on a moving path of light emitted from the light source 31.

The light source 31 may be provided to supply light to the display panel 20. The light source 31 may include a light emitting diode (LED). The LED may be provided in the form of a package in which an LED chip is mounted on a substrate and filled with a resin. However, the disclosure is not limited thereto, and a cold cathode fluorescent lamp (CCFL) or an external electrode fluorescent lamp (EEFL) may be used as the light source 31.

A plurality of the light sources 31 may be mounted on the printed circuit board 32 to be spaced apart at a predetermined interval. A circuit pattern, and the like, for transmitting driving power and signals to the light source 31 may be formed on the printed circuit board 32. The printed circuit board 32 may be seated on the bottom chassis 84.

The light emitted from the light source 31 may be directly supplied to the display panel 20 unlike an edge type display apparatus. However, the disclosure is not limited thereto, and the rear cover 100 of the display assembly 2 and a stand 200, which will be described later, may also be applied to the edge type display apparatus.

In this case, the optical sheet 50 may be disposed between the light source 31 and the display panel 20 in order to improve the characteristics of light emitted from the light source 31.

The backlight unit may include a diffusion sheet 40. The diffusion sheet 40 may cancel or minimize light irradiated from the light source 31. Because the light irradiated from the light source 31 directly enters an eye, the pattern in which the light source 31 is disposed is reflected to the eye as it is, and thus the diffusion sheet 40 may cancel or minimize the light.

In general, the diffusion sheet 40 is included in the optical sheet 50 as a component of the optical sheet 50. That is, the diffusion sheet 40 may be provided to diffuse light irradiated from the light source module 30 in all directions so that a uniform amount of light is displayed in an image in all directions.

The backlight unit may further include a reflective sheet 60 to reflect light to prevent light loss. The reflective sheet 60 may reflect light emitted from the light source 31 to be incident on the diffusion sheet 40. The reflective sheet 60 may be formed in various forms such as a sheet, a film, and a plate. For example, the reflective sheet 60 may be formed by coating a material having a high reflectivity on a base material. Stainless steel, brass, aluminum, PET, etc. may be used as the base material, and silver, $TiO_2$, etc. may be used as a high reflective coating agent. The reflective sheet 60 may be seated and supported on the printed circuit board 32.

As described above, the rear cover 100 may cover a rear side of the bottom chassis 84, and at the same time cover an edge side of the display assembly 2. However, the disclosure is not limited thereto, and the edge side of the display assembly 2 may be covered by a configuration such as an additional frame and a housing.

The display apparatus 1 may be a mount type in which the display assembly 2 is fixed to a wall or a stand type in which the display assembly 2 is mounted on a floor by the stand 200, depending on the need of a user.

Figure 3:
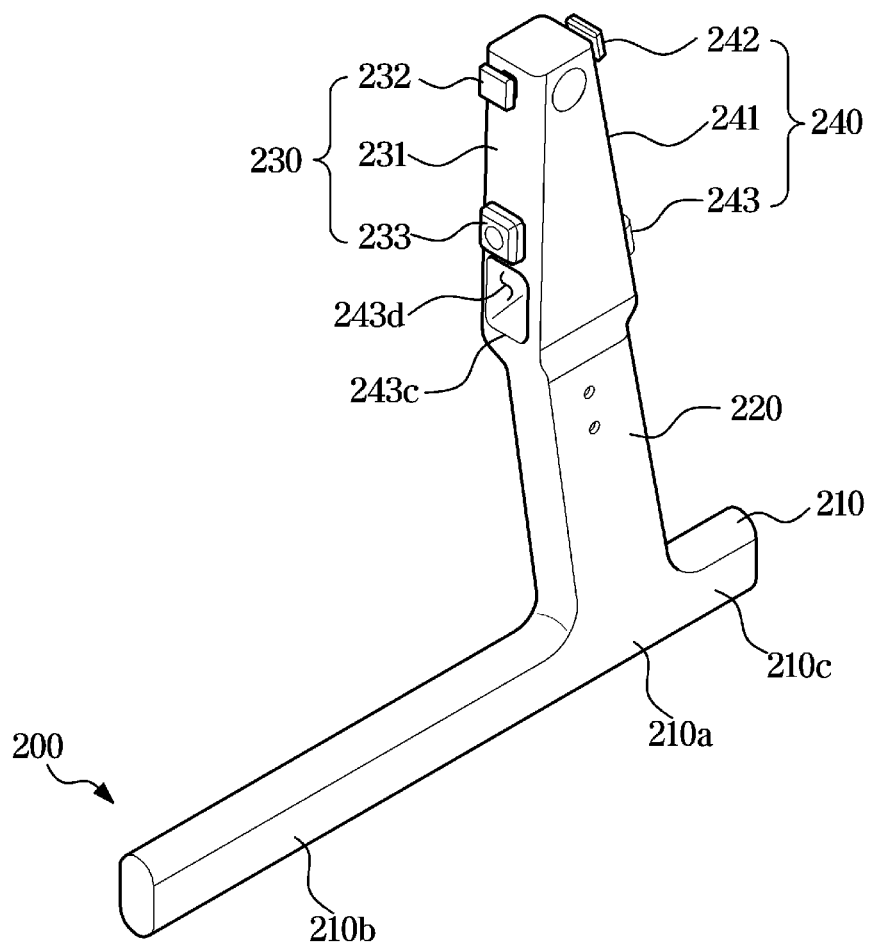
FIG. 3 is a perspective view of a stand of the display apparatus illustrated in FIG. 1.
Figure 4:
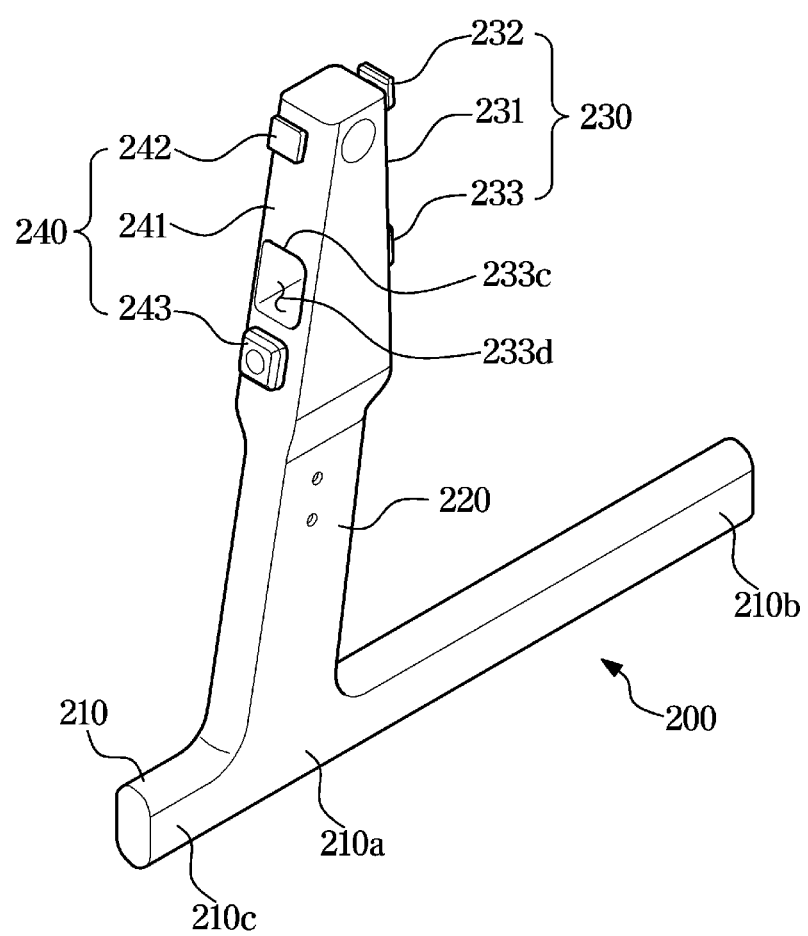
FIG. 4 is a perspective view of the stand of the display apparatus illustrated in FIG. 3, viewed from a different direction.
Figure 5:
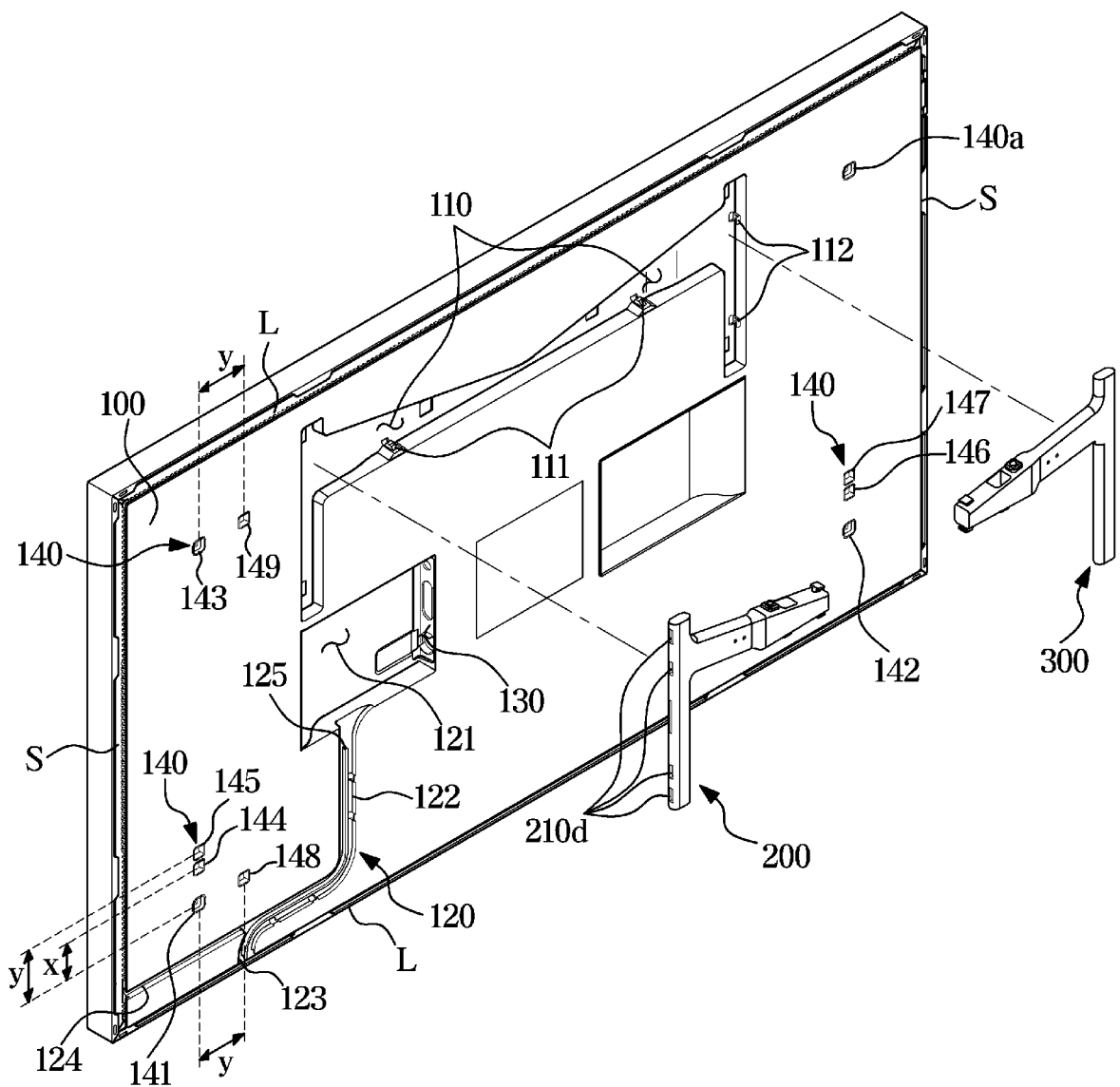
FIG. 5 is a view illustrating a process in which the stand is mounted on the display assembly illustrated in FIG. 1.
Figure 6:
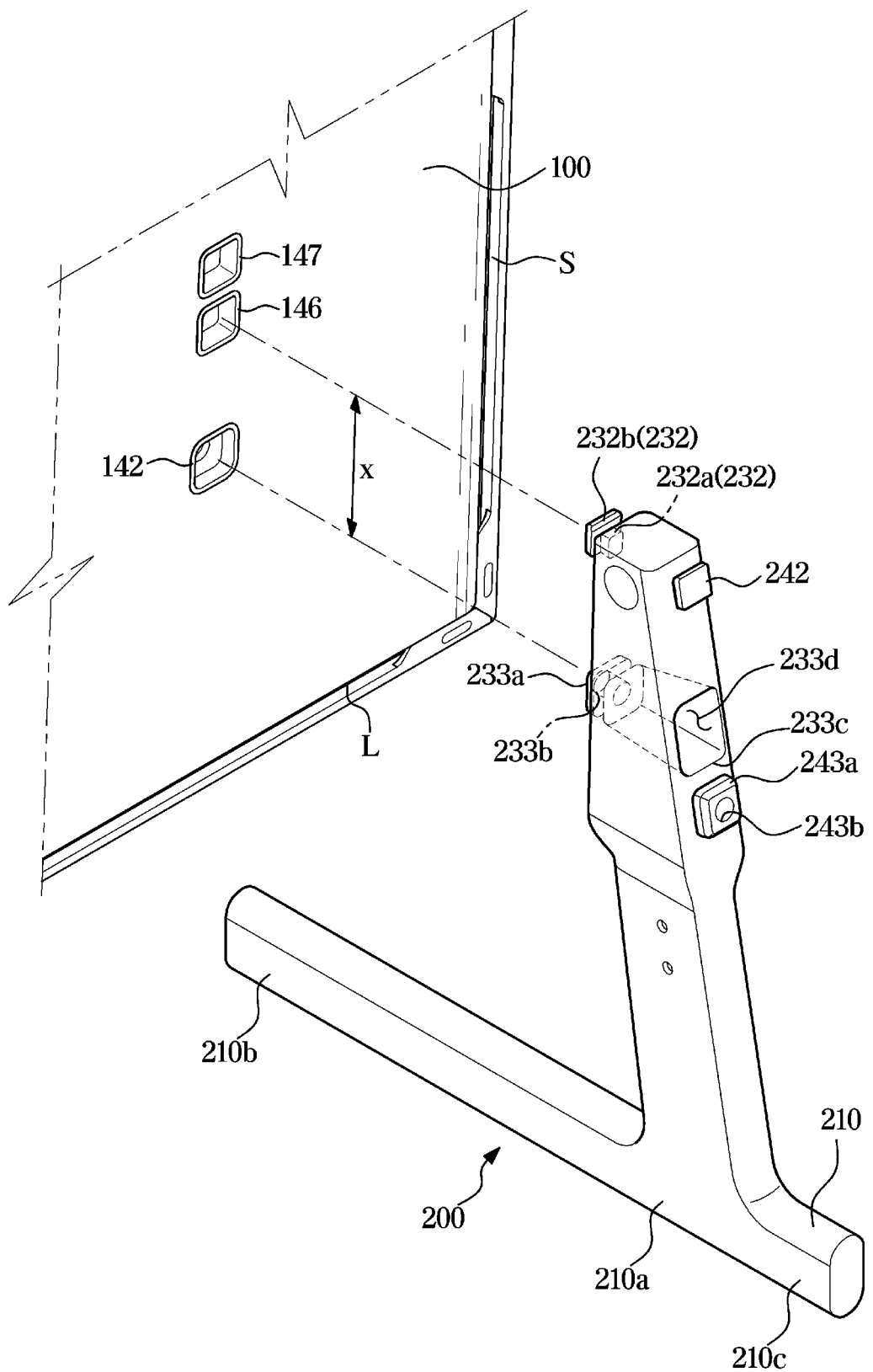
FIG. 6 is a view illustrating a process in which a first coupling part of the stand is coupled to the display assembly illustrated in FIG. 1.
Figure 7:
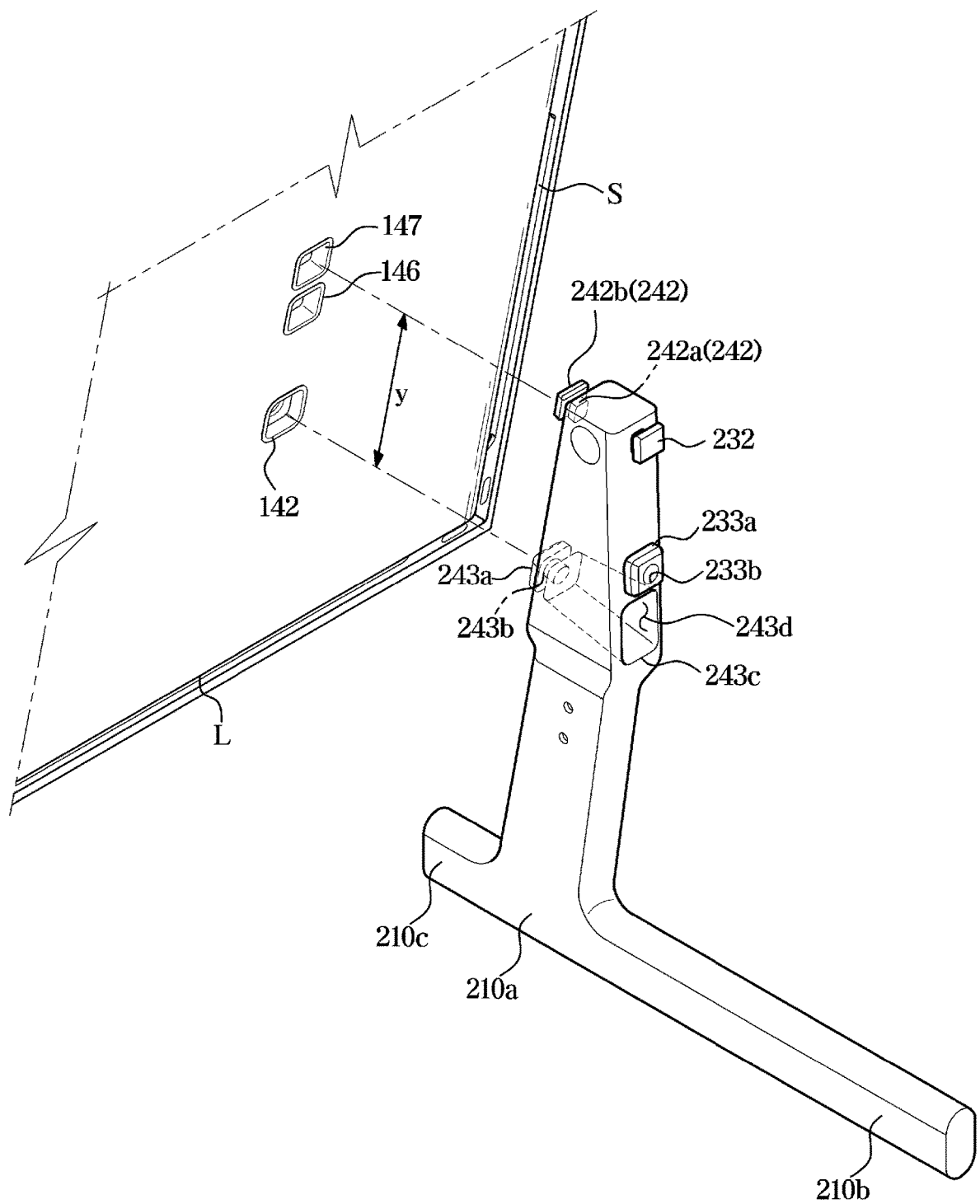
FIG. 7 is a view illustrating a process in which a second coupling part of the stand is coupled to the display assembly illustrated in FIG. 1.

FIG. 3 is a perspective view of a stand of the display apparatus illustrated in FIG. 1. FIG. 4 is a perspective view of the stand of the display apparatus illustrated in FIG. 3, viewed from a different direction. FIG. 5 is a view illustrating a process in which the stand is mounted on the display assembly illustrated in FIG. 1. FIG. 6 is a view illustrating a process in which a first coupling part of the stand is coupled to the display assembly illustrated in FIG. 1. FIG. 7 is a view illustrating a process in which a second coupling part of the stand is coupled to the display assembly illustrated in FIG. 1.

Referring to FIGS. 3 to 7, the stand 200 may include a support bar 210 to be placed on a floor (or ground) on which the display apparatus 1 is to be disposed, and a leg 220 extending upward from the support bar 210 to be combined with the display apparatus 1. The stand 200 may be detachably coupled to the rear of the display assembly 2.

The support bar 210 may extend parallel to a floor surface and may have the shape of a rod extending in the front-rear direction of the display apparatus 1. Specifically, the support bar 210 of the stand 200 may include a central portion 210a from which the leg 220 extends upward, a first extension portion 210b extending from one end of the central portion 210a in the front-rear direction of the display assembly 2 parallel to the floor surface, and a second extension portion 210c extending from the other end of the central portion 210a in the front-rear direction of the display assembly 2 parallel to the floor surface. More specifically, based on the stand 200 illustrated in FIG. 3, the first extension portion 210b may extend from a front end of the central portion 210a toward the front, and the second extension portion 210c may extend from a rear end of the central portion 210a toward the rear.

A first coupling part 230 coupled to the display assembly 2 may be formed on one upper surface of the leg 220, and a second coupling part 240 may be formed on the other upper surface of the leg 220. Specifically, based on the stand 200 illustrated in FIG. 3, one surface of the leg 220 on which the first coupling part 230 is formed may correspond to a front surface of the leg 220, and the other surface of the leg 220 on which the second coupling part 240 is formed may correspond to a rear surface of the leg 220. That is, the first coupling part 230 and the second coupling part 240 may be arranged in the front-rear direction.

The leg 220 may extend upward from the central portion 210a, and an upper end of the leg 220 may extend to be inclined in one direction parallel to the front-rear direction. Specifically, based on the stand 200 illustrated in FIG. 3, the leg 220 may extend in a direction of being inclined toward the front from the central portion 210a. Accordingly, specifically, based on the stand 200 illustrated in FIG. 3, the first coupling part 230 may be formed at a position that is more biased forward than the central portion 210a and may be positioned above the first extension portion 210b. However, the disclosure is not limited thereto, and the leg 220 may extend from the central portion 210a in a direction perpendicular to the ground.

When the display assembly 2 is coupled to the first coupling part 230, the first extension portion 210b may protrude forward of the display assembly 2, and when the display assembly 2 is coupled to the second coupling part 240, the first extension portion 210b may protrude rearward of the display assembly 2.

When the display assembly 2 is coupled to the first coupling part 230, there is a risk that the display assembly 2 falls forward due to a weight of the display assembly 2, and when the display assembly 2 is coupled to the second coupling part 240, there is a risk that the display assembly 2 falls rearward due to the weight of the display assembly 2. However, because the first extension portion 210b is formed longer than the second extension portion 210c so that the display assembly 2 may be stably supported, an accident in which the display assembly 2 falls may be prevented.

The first coupling part 230 includes a first coupling surface 231, a first hook 232 protruding from the first coupling surface 231, and a first screw coupling portion 233 formed on the first coupling surface 231 and penetrating the leg 220, and the second coupling part 240 includes a second coupling surface 241, a second hook 242 protruding from the second coupling surface 241, and a second screw coupling portion 243 formed on the second coupling surface 241 and penetrating the leg 220.

The first coupling surface 231 may correspond to one surface of the leg 220 on which the first coupling part 230 is formed. Specifically, based on the stand 200 illustrated in FIG. 3, the first coupling surface 231 may be formed on the front surface of the leg 220, and the first hook 232 may protrude forward from the first coupling surface 231. The first coupling surface 231 may be perpendicular to the front-rear direction. Accordingly, the first coupling surface 231 may be perpendicular to the support bar 210 and may be perpendicular to the floor surface on which the display apparatus 1 is disposed.

When the display assembly 2 is coupled to the first coupling part 230, the rear surface of the display assembly 2 may be in contact with the first coupling surface 231 to be disposed on the first coupling surface 231. Accordingly, the display assembly 2 may be arranged in parallel with the first coupling surface 231, and the screen 10 of the display assembly 2 may be arranged in parallel with the first coupling surface 231. When the display assembly 2 is disposed on the first coupling surface 231, the screen 10 of the display assembly 2 may be perpendicular to the front-rear direction. That is, the screen 10 of the display assembly 2 may be perpendicular to the floor surface on which the display apparatus 1 is disposed.

The second coupling surface 241 may correspond to the other surface of the leg 220 on which the second coupling part 240 is formed. Specifically, based on the stand 200 illustrated in FIG. 3, the second coupling surface 241 may be formed on the rear surface of the leg 220, and the second hook 242 may protrude from the second coupling surface 241 toward the rear.

The second coupling surface 241 may be formed such that an upper portion thereof is inclined toward the one surface of the leg 220 on which the first coupling surface 231 of the leg 220 is formed. Accordingly, a plane including the second coupling surface 241 may be provided to be inclined with respect to a plane including the first coupling surface 231. In particular, when the stand 200 is viewed from the side, an angle formed by a straight line parallel to the first coupling surface 231 and a straight line parallel to the second coupling surface 241 may be 12 degrees. However, the disclosure is not limited thereto, and various angles may be provided.

When the display assembly 2 is coupled to the second coupling part 240, the rear surface of the display assembly 2 may be in contact with the second coupling surface 241 to be disposed on the second coupling surface 241. Accordingly, the display assembly 2 may be arranged in parallel with the second coupling surface 241, and the screen 10 of the display assembly 2 may be arranged in parallel with the second coupling surface 241. When the display assembly 2 is disposed on the second coupling surface 241, the screen 10 of the display assembly 2 may be disposed such that an upper portion thereof is inclined toward the rear (see FIGS. 11 and 12). That is, the screen 10 of the display assembly 2 may be inclined with respect to the floor surface on which the display apparatus 1 is disposed.

The first hook 232 may include a first protruding part 232a protruding perpendicular to the first coupling surface 231 and a first hook part 232b extending upward perpendicular to the first protruding part 232a from one end of the first protruding part 232a. The second hook 242 may include a second protruding part 242a protruding perpendicular to the second coupling surface 241 and a second hook part 242b extending upward perpendicular to the second protruding part 242a from one end of the second protruding part 242a.

The first screw coupling portion 233 may include a convex portion 233a formed convexly on the first coupling surface 231, a first screw coupling hole 233b penetrating the first convex portion 233a to allow a screw to be fastened, a first inlet hole 233c formed on the second coupling surface 241 to allow the screw to be introduced into the leg 220 from the outside, and a first communication path 233d communicating the first inlet hole 233c and the first screw coupling hole 233b.

The second screw coupling portion 243 may include a convex portion 243a formed convexly on the second coupling surface 241, a second screw coupling hole 243b penetrating the second convex portion 243a to allow a screw to be fastened, a second inlet hole 243c formed on the first coupling surface 231 to allow the screw to be introduced into the leg 220 from the outside, and a second communication path 243d communicating the second inlet hole 243c and the second screw coupling hole 243b.

The first hook 232 and the first screw coupling portion 233 may be disposed to be spaced apart from each other by a predetermined distance, and the second hook 242 and the second screw coupling portion 243 may also be disposed to be spaced apart from each other by a predetermined distance. Specifically, the first hook 232 and the first convex portion 233a may be disposed to be spaced apart from each other by a predetermined distance, and the second hook 242 and the second convex portion 243a may also be disposed to be spaced apart from each other by a predetermined distance. In this case, a distance between the first hook 232 and the first convex portion 233a may be shorter than a distance between the second hook 242 and the second convex portion 243a.

Therefore, when the first hook 232 and the second hook 242 are positioned at the same height or at a similar height, the first screw coupling portion 233 and the second screw coupling portion 243 may be positioned at different heights from each other. The first inlet hole 233c may be disposed above the second convex portion 243a, and the second inlet hole 243c may be disposed below the first convex portion 233a.

An accommodating part 110 in which the stand 200 may be accommodated may be formed on the rear surface of the display assembly 2. The accommodating part 110 may be formed on the rear cover 100 forming the rear surface of the display assembly 2.

The accommodating part 110 may be formed in a groove shape corresponding to a shape of the stand 200 so that the stand 200 is accommodated in the rear cover 100. In detail, the accommodating part 110 may be formed in a shape corresponding to a shape in which a pair of the stand 200 and a stand 300 are arranged side by side.

The accommodating part 110 may include a plurality of receiving protrusions 111 and 112 protruding from an inner surface thereof to prevent the stand 200 from being separated from the accommodating part 110 when the stand 200 is accommodated in the accommodating part 110. The first receiving protrusion 111 may be provided at a position corresponding to the second inlet hole 243c and may be inserted into the second inlet hole 243c. A plurality of receiving grooves 210d may be formed on a lower surface of the support bar 210, and the second receiving protrusions 112 may be provided at the position corresponding to the receiving grooves 210d and may be inserted into the receiving grooves 210d. However, the disclosure is not limited thereto.

The display assembly 2 may include a signal device inserted into a sensor mounting part 101 formed on one side of the rear cover 100 to transmit or receive a wireless signal to or from an external device. The display assembly 2 may include a controller S100 to control the display panel 20, a cable coupling part 130 to which a cable C (see FIGS. 8, 10, and 12) that is electrically connected to the controller S100 to transmit and receive signals is coupled, and a cable guide 120 to guide a position of the cable C coupled to the cable coupling part 130.

A cable accommodating space 121 to accommodate the cable C that is electrically connected to the controller S100 and the cable guide 120 to guide the position of the cable C may be formed on the rear surface of the display assembly 2.

The rear cover 100 may include the cable accommodating space 121 formed by recessing a rear surface of the rear cover 100 corresponding to the rear surface of the display assembly 2 toward the front of the display assembly 2.

Because the cable coupling part 130 is formed on one surface of the cable accommodating space 121 and the cable guide 120 is connected to the other surface of the cable accommodating space 121, the cable accommodating space 121 may communicate with the cable coupling part 130 and the cable guide 120, and the cable C coupled to the cable coupling part 130 may pass through the cable accommodating space 121 and the cable guide 120. The cable accommodating space 121 may be covered by a separate cover that may form a part of the rear surface of the display assembly 2.

Referring to FIG. 5, the cable guide 120 may include a first guide groove 122 having one side communicating with the cable accommodating space 121 and the other side being open to the outside from the lower long side L side of the rear surface of the display assembly 2, a second guide groove 123 having one side communicating with the cable accommodating space 121 and the other side being open to the outside from the lower long side L side of the rear surface of the display assembly 2, and a third guide groove 124 branched from the second guide groove 123 and having one side communicating with the second guide groove 123 and the other side being open externally from the side short side S side of the rear surface of the display assembly 2. The cable guide 120 may include a separation rib 125 to partition the first guide groove 122 and the second guide groove 123 between the first guide groove 122 and the second guide groove 123.

The lower long side L of the rear surface of the display assembly 2 in which the other side of the first guide groove 122 and the other side of the second guide groove 123 are open may correspond to a lower side of the rear surface of the display assembly 2 in a first mode, which will be described later, and the side short side S side of the rear surface of the display assembly 2 in which the other side of the third guide groove 124 is open may correspond to a lower side of the rear surface of the display assembly 2 in a third mode, which will be described later.

When a user uses the display apparatus 1 in one of the first mode, a second mode, and the third mode, which will be described later, the user may withdraw one end of the cable C, that is not coupled to the cable coupling part 130 at the open other side by passing through one of the first guide groove 122, the second guide groove 123, and the third guide groove 124, according to convenience.

For example, in the first mode and the second mode, the cable C may be guided by the first guide groove 122 or the second guide groove 123, and in the third mode, the cable C may be guided by the third guide groove 124, but the above example is illustrative, and the disclose is not limited thereto.

A plurality of fastening parts 140 to which the stand 200 may be coupled may be formed on the rear surface of the display assembly 2. The fastening parts 140 may be formed on the rear cover 100 forming the rear surface of the display assembly 2.

The fastening parts 140 may include hook coupling portions 144, 145, 146, 147, 148, and 149 provided such that the first hook 232 or the second hook 242 may be coupled thereto, and screw fastening portions 141, 142, and 143 corresponding to the first screw coupling portion 233 or the second screw coupling portion 243 and to allow the stand 200 and the display assembly 2 to be coupled using screws. A plurality of the hook coupling portions 144, 145, 146, 147, 148, and 149 may be provided. A plurality of the screw fastening portions 141, 142, and 143 may be provided.

The hook coupling portions 144, 145, 146, 147, 148 and 149 may be formed in a recess shape so that the hooks 232 and 242 may be inserted, and surfaces of the recesses corresponding to the hook parts 232b and 242b may have a shape of a groove or a hole so that the hook parts 232b and 242b of the corresponding hooks 232 and 242 may be inserted. Accordingly, the first hook 232 or the second hook 242 may be hooked by being inserted into the hook coupling portions 144, 145, 146, 147, 148, and 149.

The screw fastening portions 141, 142, and 143 may have a recess shape so that the convex portions 233a and 243a may be inserted. A screw coupling hole 140b may be formed on one surface of the recess to correspond to the first screw coupling hole 233b or the second screw coupling hole 243b. As a screw penetrating the first screw coupling hole 233b or the second screw coupling hole 243b penetrates the screw coupling hole 140b, the screw fastening portions 141, 142, and 143 may be coupled to the first screw coupling hole 233b or the second screw coupling hole 243b by screws.

FIGS. 6 and 7 illustrate that the screw fastening portion 142 of the screw fastening portions 141, 142, and 143 and the hook coupling portions 146 and 147 of the hook coupling portions 144, 145, 146, 147, 148, and 149 are coupled to the first coupling part 230 and the second coupling part 240, but this is illustrative, and the above coupling may also be applied to all the screw fastening portions and hook coupling portions corresponding to each other.

The screw fastening portions 141, 142, and 143 may be formed at three corners of the rear surface of the display assembly 2 having a rectangular shape. Specifically, the first screw fastening portion 141 may be formed at a corner adjacent to the cable guide 120, the second screw fastening portion 142 may be formed at a corner spaced apart in a direction parallel to the long side L and perpendicular to the short side S from the first screw fastening portion 141, and the third screw fastening portion 143 may be formed at a corner spaced apart in a direction parallel to the short side S and perpendicular to the long side L from the first screw fastening portion 141.

However, the disclosure is not limited thereto, and the screw fastening portion 141 may further include an auxiliary screw fastening portion 140a formed at a corner spaced apart in a direction perpendicular to the long side L of the display assembly 2 from the second screw fastening portion 142. A screw may be fastened to the auxiliary screw fastening portion 140a when the display apparatus 1 is mounted on a wall.

The first screw fastening portion 141 and the second screw fastening portion 142 may be formed symmetrically, and the first screw fastening portion 141 and the third screw fastening portion 143 may be formed symmetrically.

The first screw fastening portion 141 and the second screw fastening portion 142 may be formed symmetrically, and the first screw fastening portion 141 and the third screw fastening portion 143 may be formed symmetrically. The first screw fastening portion 141, the second screw fastening portion 142, the third screw fastening portion 143, and the auxiliary screw fastening portion 140a may be formed symmetrically with respect to each other.

The hook coupling portions may be formed at three corners of the rear surface of the display assembly 2 having a rectangular shape. That is, the plurality of hook coupling portions 144, 145, 146, 147, 148, and 149 may be provided at positions adjacent to the first screw fastening portion 141, the second screw fastening portion 142, and the third screw fastening portion 143. However, the disclosure is not limited thereto, and a plurality of hook coupling portions may be additionally provided at a position adjacent to the auxiliary screw fastening portion 140a in a corner where the auxiliary screw fastening portion 140a is formed.

The display assembly 2 according to the present embodiment may be provided with six of the hook coupling portions, but is not limited thereto, and the number of hook coupling portions may be less or more than six.

Referring to FIGS. 5 to 7, the hook coupling portions may include the first hook coupling portion 144 formed to be spaced apart upward from the first screw fastening portion 141 by a first distance x, the second hook coupling portion 145 formed to be spaced apart upward from the first screw fastening portion 141 by a second distance y, the third hook coupling portion 145 formed to be spaced apart upward from the second screw fastening portion 142 by the first distance x, and the fourth hook coupling portion 147 formed to be spaced apart upward from the second screw fastening portion 142 by the second distance y.

To be spaced apart upward from the first screw fastening portion 141 or the second screw fastening portion 142 may correspond to being spaced apart in a direction perpendicular to the long side L toward a line parallel to the long side L and passing through the center of the display assembly 2 from the first screw fastening portion 141 or the second screw fastening portion 142.

Referring to FIGS. 5 to 7, the hook coupling portions may include the fifth hook coupling portion 148 formed to be spaced apart in a lateral direction from the first screw fastening portion 141 by the second distance y, and the sixth hook coupling portion 149 formed to be spaced apart in a lateral direction from the third screw fastening portion 143 by the second distance y.

To be spaced apart in the lateral direction from the first screw fastening portion 141 or the third screw fastening portion 143 may correspond to being spaced apart in a direction perpendicular to the short side S toward a line parallel to the short side S and passing through the center of the display assembly 2 from the first screw fastening portion 141 or the third screw fastening portion 143.

The first hook 232 may be coupled to the first hook coupling portion 144 and the third hook coupling portion 146. The second hook 242 may be coupled to the second hook coupling portion 145, the fourth hook coupling portion 147, the fifth hook coupling portion 148, and the sixth hook coupling portion 149.

Specifically, the first distance x may correspond to a separation distance between the first hook 232 and the first convex portion 233a, and the second distance y may correspond to a separation distance between the second hook 242 and the second convex portion 243a. Accordingly, the first hook 232 may be coupled to the hook coupling portions 144 and 146 spaced apart from the screw fastening portions 141 and 142 by the first distance x, and the second hook 242 may be coupled to the hook coupling portions 145, 147, 148, and 149 spaced apart from the screw fastening portions 141, 142, and 143 by the second distance y.

Figure 8:
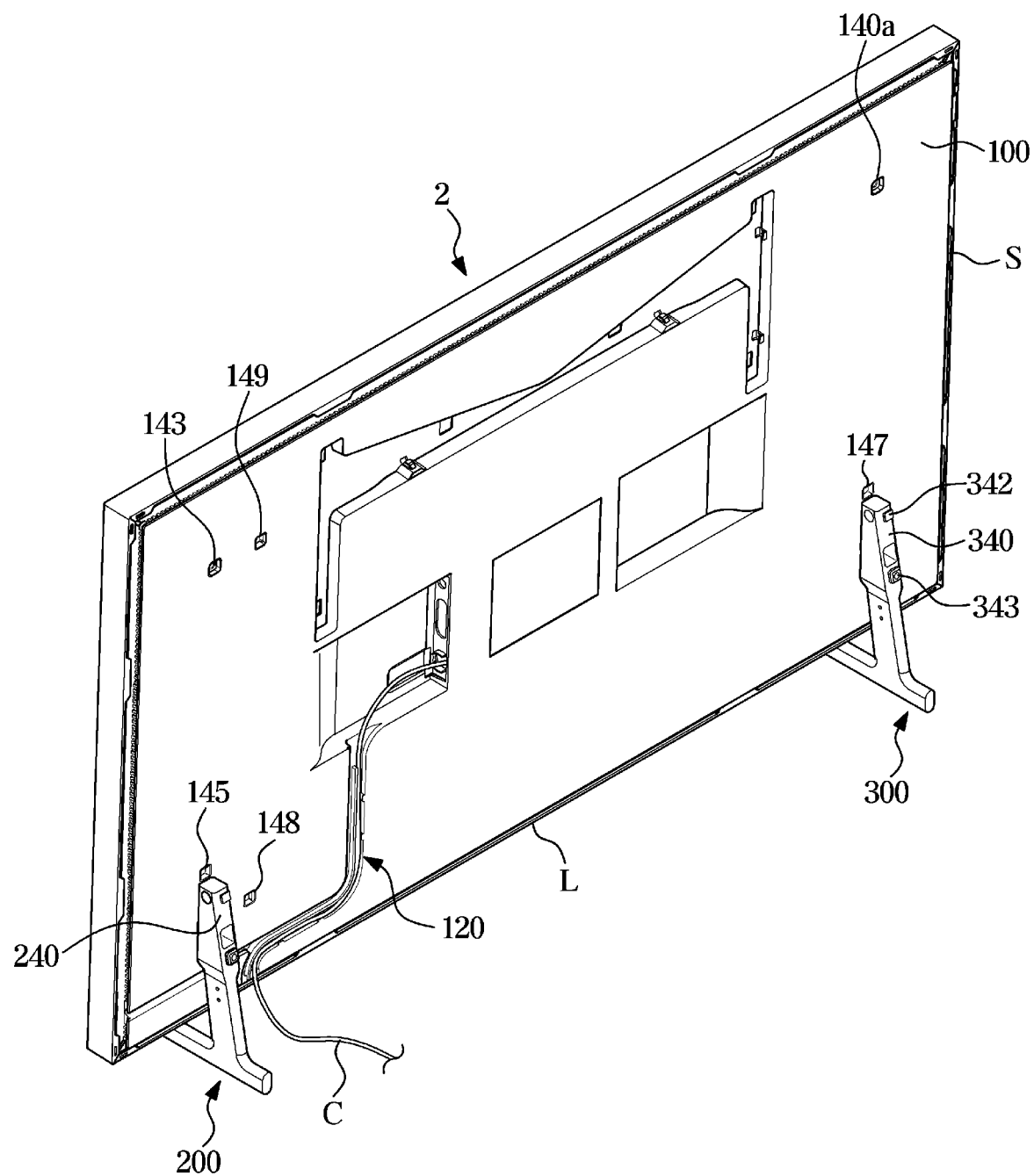
FIG. 8 illustrates the display apparatus according to an embodiment of the disclosure which is in a state of a first mode.
Figure 9:
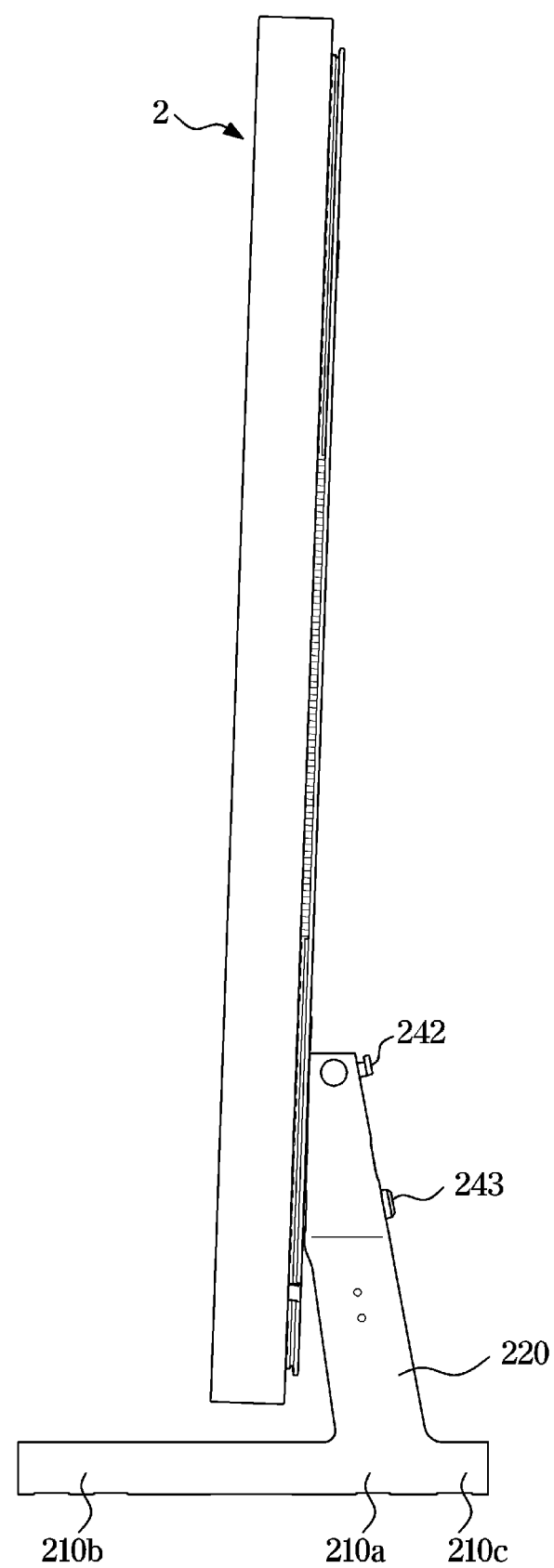
FIG. 9 is a side view of the display apparatus illustrated in FIG. 8.
Figure 10:
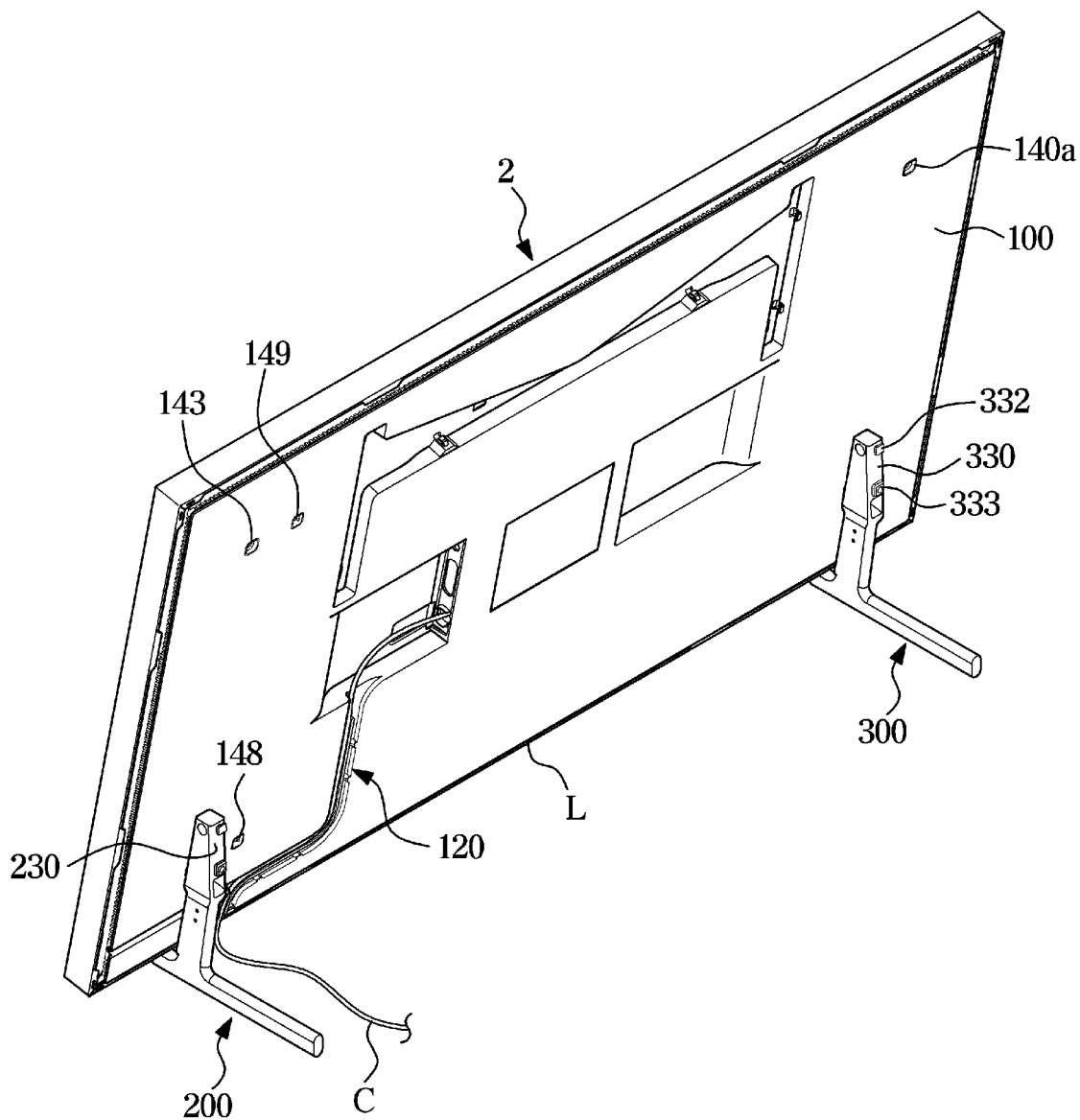
FIG. 10 illustrates the display apparatus according to an embodiment of the disclosure which is in a state of a second mode.
Figure 11:
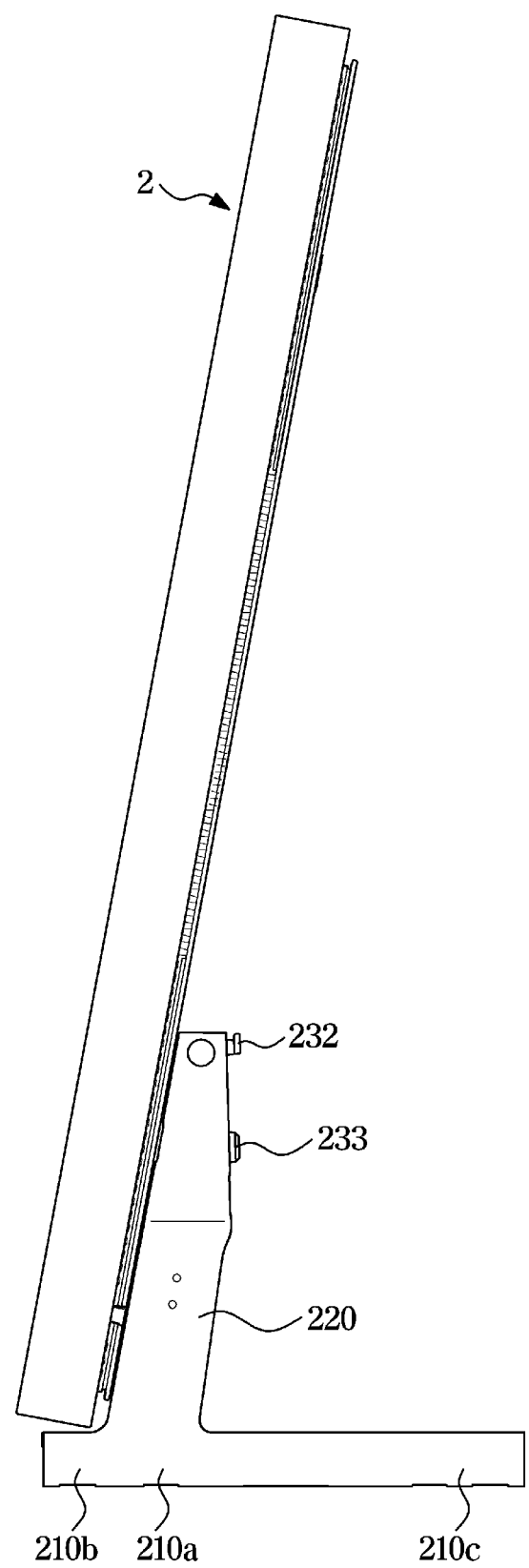
FIG. 11 is a side view of the display apparatus illustrated in FIG. 10.
Figure 12:
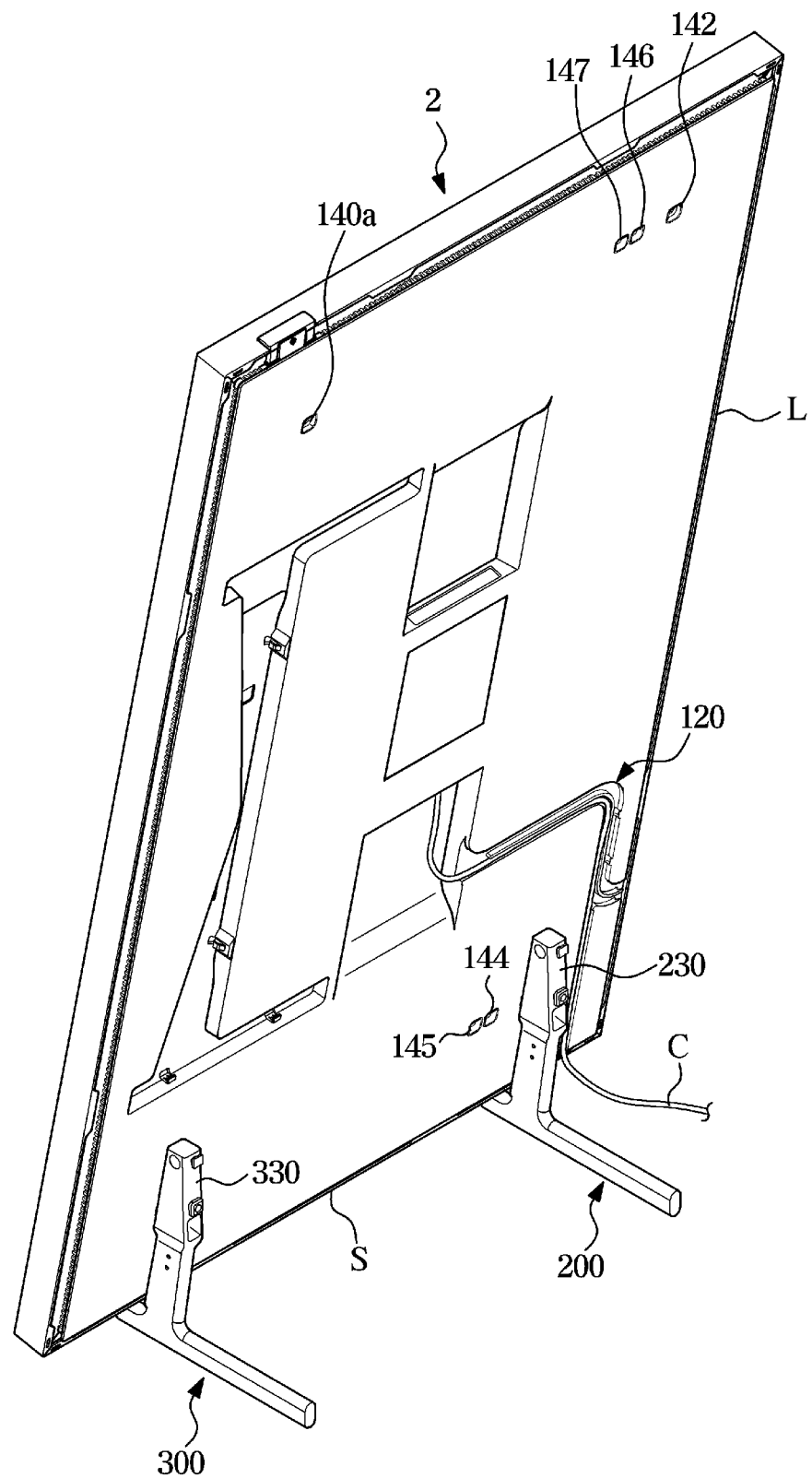
FIG. 12 illustrates the display apparatus according to an embodiment of the disclosure which is in a state of a third mode.

FIG. 8 illustrates the display apparatus according to an embodiment of the disclosure which is in a state of a first mode. FIG. 9 is a side view of the display apparatus illustrated in FIG. 8. FIG. 10 illustrates the display apparatus according to an embodiment of the disclosure which is in a state of a second mode. FIG. 11 is a side view of the display apparatus illustrated in FIG. 10. FIG. 12 illustrates the display apparatus according to an embodiment of the disclosure which is in a state of a third mode.

Referring to FIGS. 8 to 12, the stand 200 may be provided as a pair including the first stand 200 and the second stand 300. The first stand 200 may include the first coupling part 230 and the second coupling part 240, and the second stand 300 may include a third coupling part 330 identical to the first coupling part 230 and a fourth coupling part 340 identical to the second coupling part 240.

As the lower and upper sides of the rear surface of the display assembly 2 are positioned to correspond to the long side L and the two sides of the rear surface are positioned to correspond to the short side S, the display assembly 2 may be mounted on the stands 200 and 300 so that the screen 10 of the display assembly 2 is disposed vertically with respect to the front-rear direction. That is, the screen 10 of the display assembly 2 may be disposed vertically with respect to the floor surface on which the display apparatus 1 is placed.

Specifically, the first hook 232 of the first stand 200 is coupled to the first hook coupling portion 144, the first screw coupling portion 233 of the first stand 200 may be coupled to the first screw fastening portion 141, a third hook 332 of the second stand 300 is coupled to the third hook coupling portion 146, and a third screw coupling portion 333 may be coupled to the second screw fastening portion 142. In this case, the display assembly 2 may be mounted on the stand 200 and 300 such that the two long sides L of the rear surface of the display assembly 2 are positioned at the lower side and the upper side, and the two short sides S of the rear surface are positioned perpendicular to the floor surface at the opposite sides. A state of being mounted as described above is referred to as the first mode.

As the lower side and the upper side of the rear surface of the display assembly 2 are positioned to correspond to the long side L and the two sides of the rear surface are positioned to correspond to the short side S, the display assembly 2 may be mounted on the stands 200 and 300 such that the upper portion of the screen 10 of the display assembly 2 is disposed to be inclined toward the rear. That is, the screen 10 of the display assembly 2 may be disposed to be inclined with respect to the floor surface on which the display apparatus 1 is placed.

Specifically, the second hook 242 of the first stand 200 is coupled to the second hook coupling portion 145, the second screw coupling portion 243 of the first stand 200 may be coupled to the first screw fastening portion 141, a fourth hook 342 of the second stand 300 is coupled to the fourth hook coupling portion 147, and a fourth screw coupling portion 343 of the second stand 300 may be coupled to the second screw fastening portion 142. In this case, the display assembly 2 may be mounted on the stands 200 and 300 such that the two long sides L of the rear surface of the display assembly 2 are positioned at the lower and upper portions, and the two short sides S of the rear surface are positioned to be inclined with respect to the floor surface at the opposite sides. A state of being mounted as described above is referred to as the second mode.

As the upper and lower sides of the rear surface of the display assembly 2 are positioned to correspond to the short side S and the two sides of the rear surface are positioned to correspond to the long side L, the display assembly 2 may be mounted on the stands 200 and 300 such that the upper portion of the screen 10 of the display assembly 2 is disposed to be inclined toward the rear. That is, the screen 10 of the display assembly 2 may be disposed to be inclined with respect to the floor surface on which the display apparatus 1 is placed.

Specifically, the second hook 242 of the first stand 200 is coupled to the fifth hook coupling portion 148, the second screw coupling portion 243 of the first stand 200 may be coupled to the first screw fastening portion 141, the fourth hook 342 of the second stand 300 is coupled to the sixth hook coupling portion 149, and the fourth screw coupling portion 343 of the second stand 300 may be coupled to the third screw fastening portion 143. In this case, the display assembly 2 may be mounted on the stands 200 and 300 such that the two short sides S of the rear surface of the display assembly 2 are positioned at the lower and upper portions, and the two long sides L of the rear surface are positioned to be inclined with respect to the floor surface at the opposite sides. A state of being mounted as described above is referred to as the third mode.

The first mode and the second mode may be referred to as the horizontal mode, and the third mode may be referred to as a vertical mode.

Figure 13:
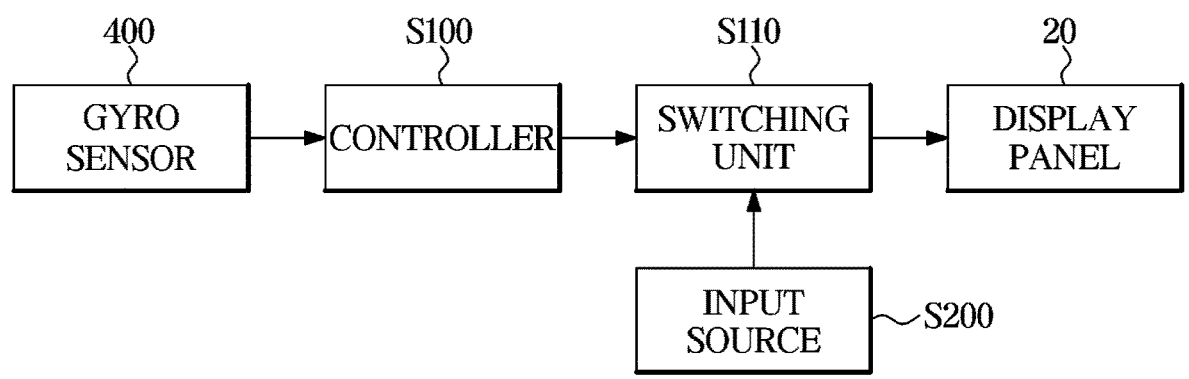
FIG. 13 is a control block diagram of the display apparatus according to an embodiment.
Figure 14:
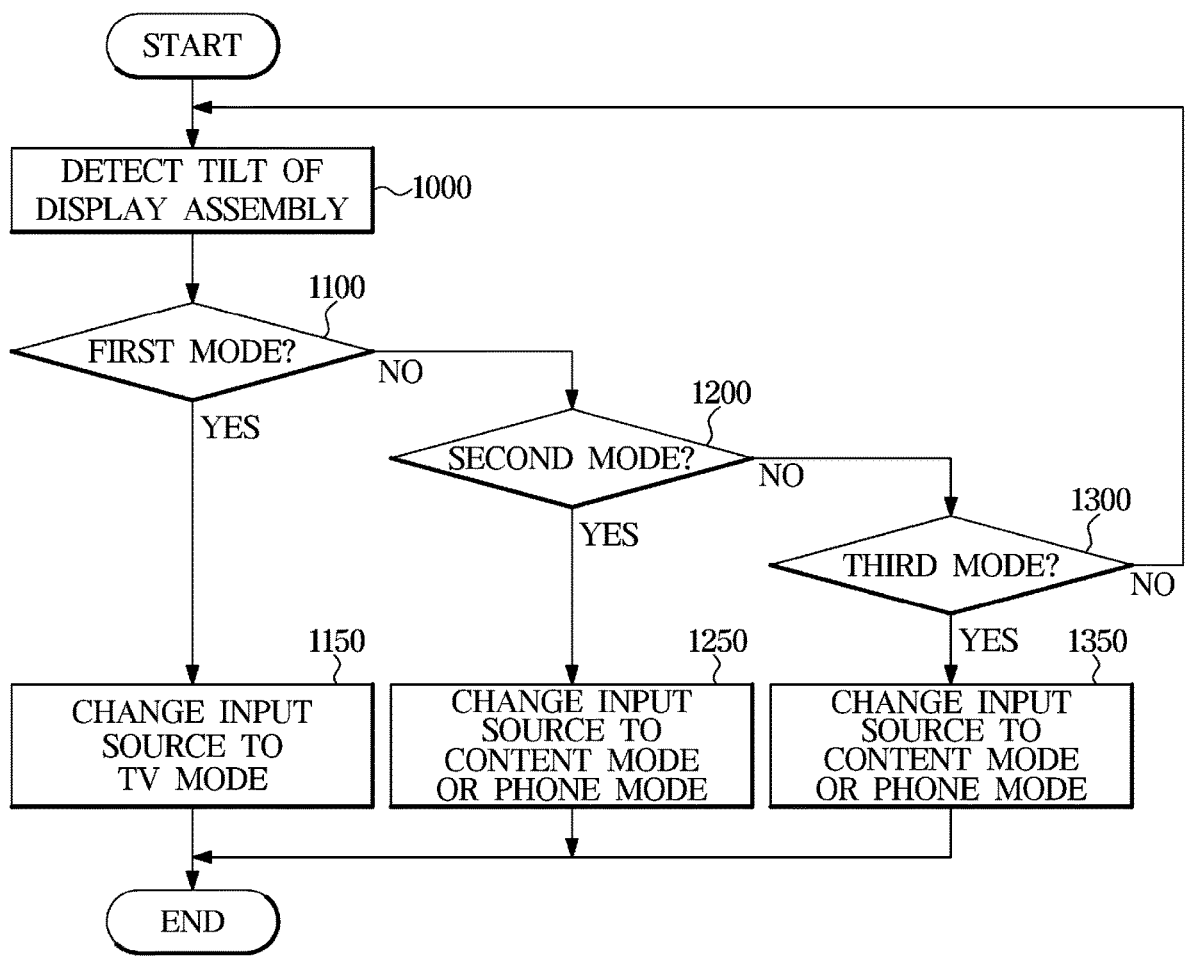
FIG. 14 is a flowchart of a method of controlling the display apparatus according to an embodiment.
Figure 15:
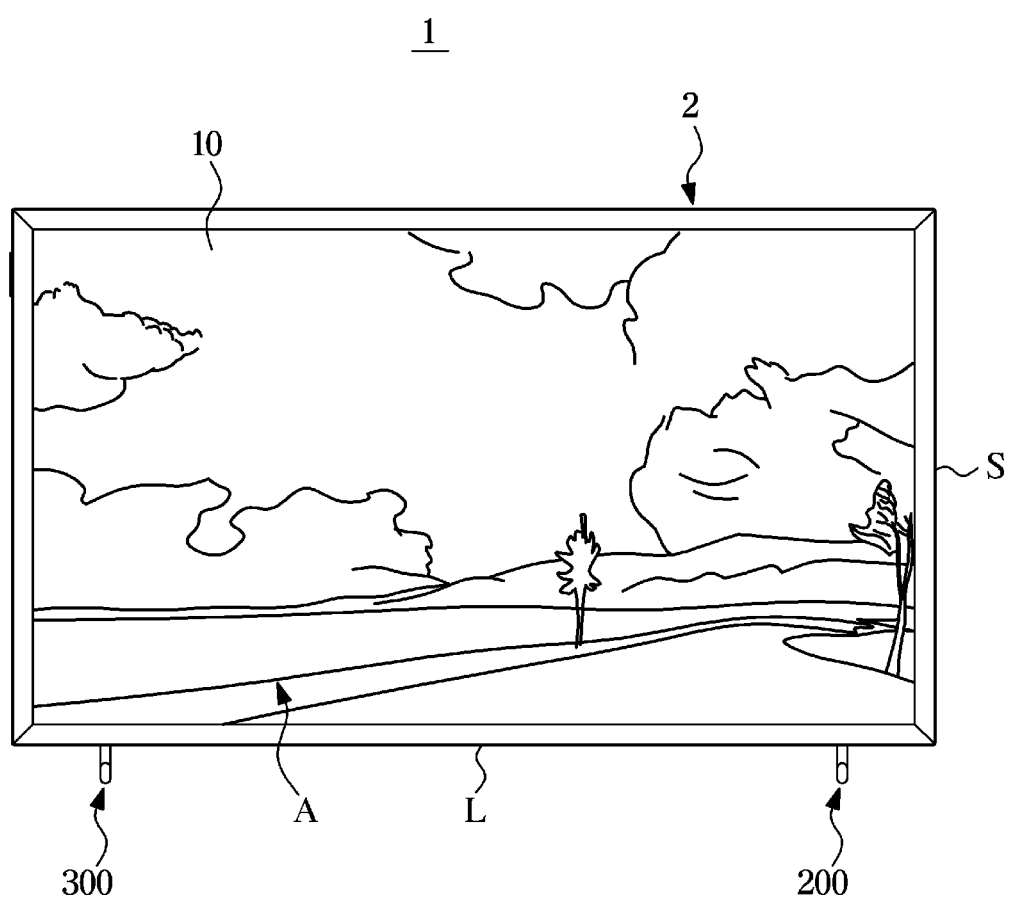
FIG. 15 is a view schematically illustrating a situation in which content is displayed on a screen of the display apparatus according to an embodiment in the second mode.
Figure 16:
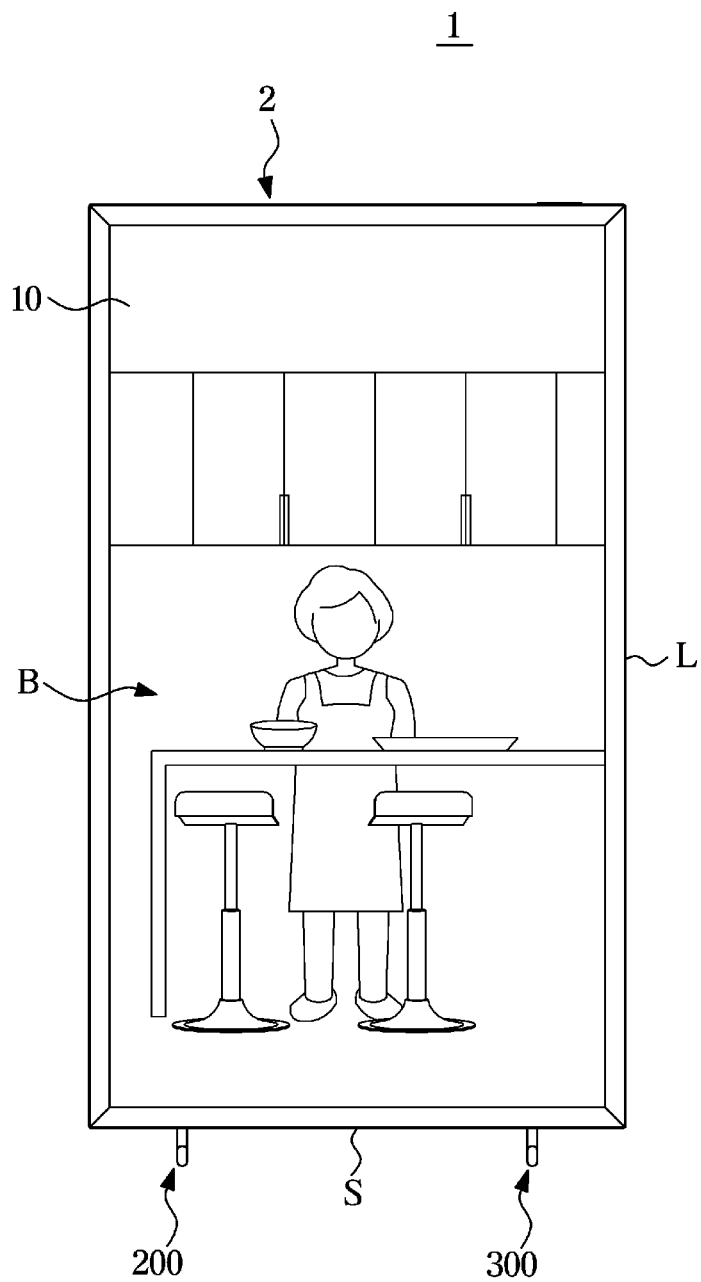
FIG. 16 is a view schematically illustrating a situation in which content or a screen of a user terminal according to a phone mode is displayed on the screen of the display apparatus according to an embodiment in the third mode.
Figure 17:
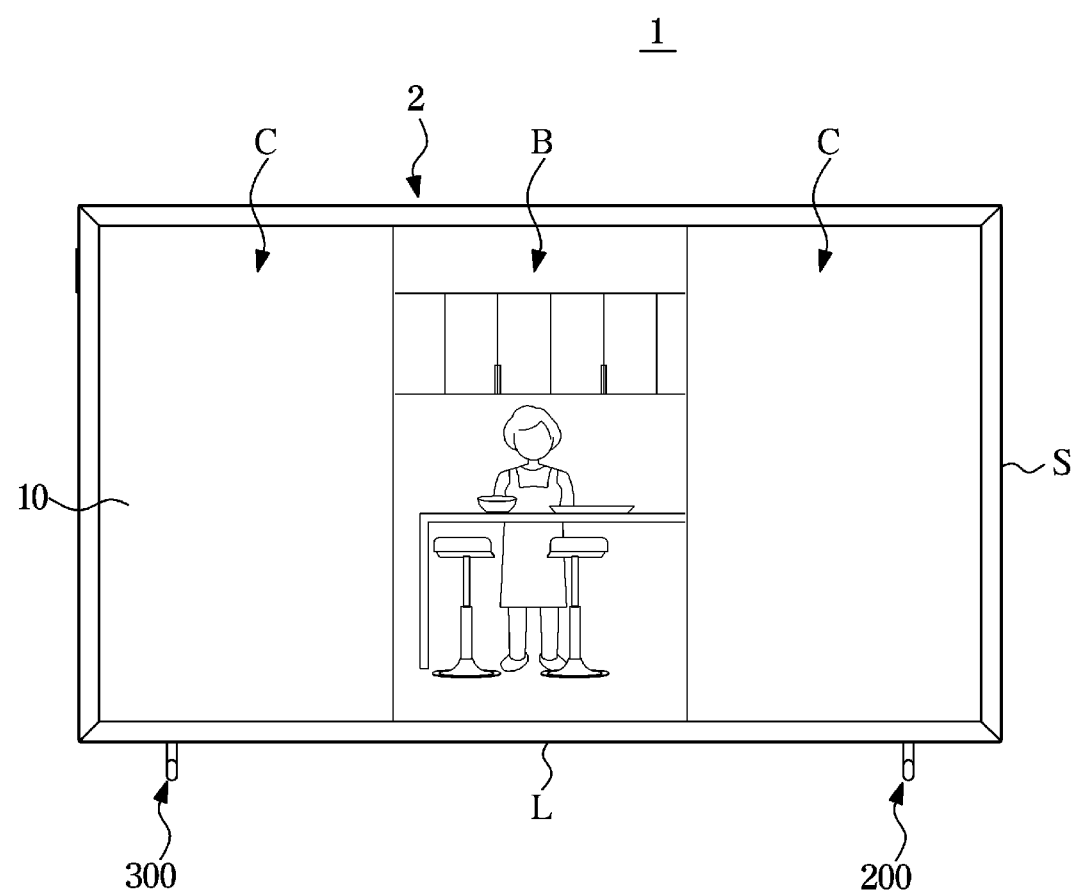
FIG. 17 is a view schematically illustrating a first situation in which the screen of the user terminal according to the phone mode is displayed on the screen of the apparatus according to an embodiment in the second mode.
Figure 18:
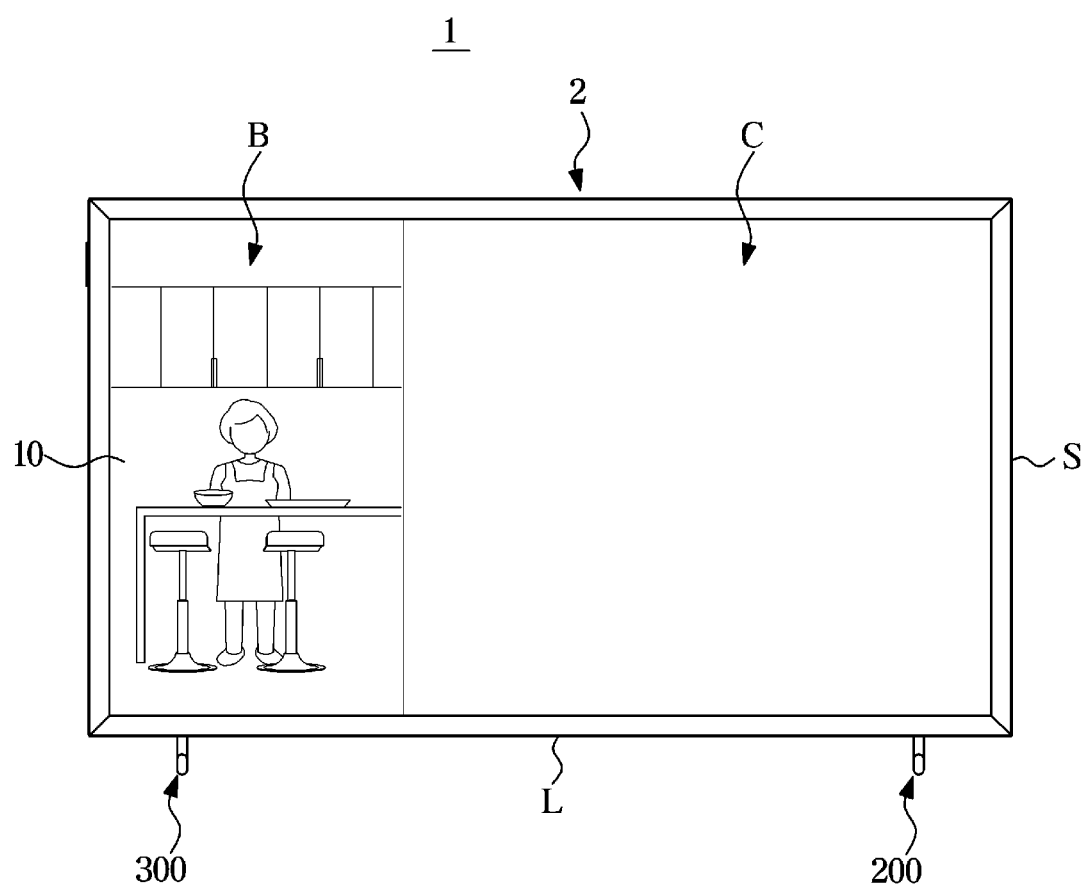
FIG. 18 is a view schematically illustrating a second situation in which the screen of the user terminal according to the phone mode is displayed on the screen of the apparatus according to an embodiment in the second mode.

FIG. 13 is a control block diagram of the display apparatus according to an embodiment. FIG. 14 is a flowchart of a method of controlling the display apparatus according to an embodiment. FIG. 15 is a view schematically illustrating a situation in which content is displayed on a screen of the display apparatus according to an embodiment in the second mode. FIG. 16 is a view schematically illustrating a situation in which content or a screen of a user terminal according to a phone mode is displayed on the screen of the display apparatus according to an embodiment in the third mode. FIG. 17 is a view schematically illustrating a first situation in which the screen of the user terminal according to the phone mode is displayed on the screen of the apparatus according to an embodiment in the second mode. FIG. 18 is a view schematically illustrating a second situation in which the screen of the user terminal according to the phone mode is displayed on the screen of the apparatus according to an embodiment in the second mode.

Hereinafter, a process of determining an input source of an image displayed on the display panel will be described with reference to FIGS. 13 and 14.

Referring to FIGS. 13 and 14, the display apparatus 1 according to an embodiment may include a gyro sensor 400, the controller S100, a switching unit S110, and the display panel 20.

The gyro sensor 400 is provided in the display assembly 2 and may detect a tilt of the display assembly 2 by measuring an angular velocity of the display assembly 2.

The gyro sensor 400 may be combined or replaced with a three-dimensional acceleration sensor, but in the case of a sensor capable of detecting a tilt of the display assembly 2, it may be employed instead of the gyro sensor without limitation.

The controller S100 may obtain information on the tilt of the display assembly 2 from the gyro sensor 400. Specifically, the controller S100 may receive an angular velocity signal of the display assembly 2 from the gyro sensor 400.

The controller S100 may determine in which mode the display assembly 2 is mounted on the stands 200 and 300 based on tilt information of the display assembly 2 received from the gyro sensor 400.

For example, when it is determined that the long side L of the display assembly 2 is horizontal with the ground and the short side S of the display assembly 2 is perpendicular to the ground, the controller S100 may determine that the display assembly 2 is mounted on the stands 200 and 300 in the first mode.

When it is determined that the long side L of the display assembly 2 is horizontal with the ground and the short side S of the display assembly 2 is not perpendicular to the ground, the controller S100 may determine that the display assembly 2 is mounted on the stands 200 and 300 in the second mode.

When it is determined that the short side S of the display assembly 2 is horizontal with the ground, the controller S100 may determine that the display assembly 2 is mounted on the stands 200 and 300 in the third mode.

The controller S100 may change an input source S200 of an image output through the screen 10 of the display assembly 2 based on the mode in which the display assembly 2 is mounted on the stands 200 and 300.

That is, the controller S100 may change the input source S200 of an image output through the screen 10 of the display assembly 2 based on the tilt of the display assembly 2. Specifically, the controller S100 may control the switching unit S110 so that the specific input source S200 is applied to the display panel 20.

The controller S100 may include a processor and a power circuit board on which the processor is mounted. The controller S100 may also include a memory, a processor, and a control circuit board on which the memory and the processor are mounted.

The memory of the controller S100 may store data associated with an algorithm for controlling the operation of components in the display apparatus such as the switching unit S110 and the display panel 20 or a program that reproduces the algorithm, and the processor may perform the above-described operations or operations described elsewhere herein by using the data stored in the memory.

The switching unit S110 may change the input source S200 applied to the display panel 20 based on a control signal of the controller S100.

Although FIG. 13 illustrates the controller S100 and the switching unit S110 as being separate components, the controller S100 and the switching unit S110 may be implemented as a single component by integrating at least one processor and at least one memory.

The input source S200 may include a TV mode, an A/V mode, a PC mode, a phone mode, a content mode, and the like.

The TV mode may include all modes for receiving TV broadcast signals, and the phone mode may include a mode for receiving a screen of a user terminal by interworking with the user terminal such as a smart phone, a laptop, or a tablet PC.

The content mode may include a mode for receiving preset content. The preset content may include various images such as an image of a work of art and an image of a character. The content may include, in particular, still images.

The display panel 20 may display an image received from the input source S200 on the screen 10.

Various components of the display apparatus 1 have been described. Hereinafter, a control process of the display apparatus 1 using various components of the display apparatus 1 will be described.

Referring to FIG. 13, the gyro sensor 400 may detect the tilt of the display assembly 2 (operation 1000), and the controller S100 may receive tilt information of the display assembly 2 from the gyro sensor 400.

Thereafter, the controller S100 may determine in which mode the display assembly 2 is mounted on the stands 200 and 300 based on the tilt of the display assembly 2 (operations 1100, 1200, and 1300).

The state in which the display assembly 2 is mounted on the pair of stands 200 and 300 in the first mode may mean a state in which the display assembly 2 is coupled to the first coupling part 230 and the third coupling part 330, and the state in which the display assembly 2 is mounted on the pair of stands 200 and 300 in the second or third mode may mean a state in which the display assembly 2 is coupled to the second coupling part 240 and the fourth coupling part 340.

Furthermore, the state in which the display assembly 2 is coupled to the second coupling part 240 and the fourth coupling part 340 and the short side S of the display assembly 2 is horizontal to the ground may mean the third mode, and the state in which the long side L of the display assembly 2 is horizontal to the ground may mean the second mode.

Based on determining that the display assembly 2 is mounted on the stands 200 and 300 in the first mode (operation 1100—YES), the controller S100 may control the switching unit S110 to change the input source S200 to the TV mode (operation 1150). That is, based on user mounting the display assembly 2 on the stands 200 and 300 in the first mode, the display apparatus 1 may be automatically switched to the TV mode.

Based on determining that the display assembly 2 is mounted on the stands 200 and 300 in the second mode (operation 1200—YES) or the third mode (operation 1300—YES), the controller S100 may control the switching unit S110 to change the input source S200 to the content mode (operation 1250 or operation 1350). That is, based on user mounting the display assembly 2 on the stands 200 and 300 in the second mode or the third mode, the display apparatus 1 may be automatically switched to the content mode.

In this case, the controller S100 may control the display panel 20 to display a list of preset content that may be received in the content mode.

Specifically, based on determining that the display assembly 2 is mounted on the stands 200 and 300 in the third mode, the controller S100 may determine that the preset content is content B having an aspect ratio in which the vertical side is larger than the horizontal side and may display a list of contents having an aspect ratio in which the vertical side is larger than the horizontal side.

Alternatively, based on the controller S100 determining that the display assembly 2 is mounted on the stands 200 and 300 in the second mode, the controller S100 may determine that the preset content is content A having an aspect ratio in which the horizontal side is larger than the vertical side and may display a list of content having the aspect ratio in which the horizontal side is larger than the vertical side.

That is, the user may select any one content from the list of preset content, and the display panel may display the content A and B selected by the user on the screen 10.

Based on determining that the display assembly 2 is mounted on the stands 200 and 300 in the second mode (operation 1200—YES) or the third mode (operation 1300—

YES) according to the setting of the user, the controller S100 may change the input source S200 to the phone mode by controlling the switching unit S110 (operation 1250 or operation 1350).

Referring to FIG. 16, in the third mode, a screen B of the user terminal having an aspect ratio in which the vertical side is larger than the horizontal side may be displayed on the screen 10 of the display assembly 2.

Referring to FIGS. 17 and 18, in the second mode, a screen B of the user terminal having an aspect ratio in which the vertical side is larger than the horizontal side may be displayed on the screen 10 of the display assembly 2. Any TV broadcast or content may not be displayed in an area C disposed on opposite sides of the screen B of the user terminal displayed on the screen 10 of the display assembly 2 or disposed on one side.

However, the disclosure is not limited thereto, and preset content may be displayed in the area C disposed on the opposite sides of the screen B of the user terminal displayed on the screen 10 of the display assembly 2 or disposed on one side. The areas C disposed on the opposite sides of the screen B of the user terminal may be disposed to face each other based on the screen B of the user terminal.

As described above, the display apparatus 1 automatically may select an input source suitable for the mounting mode of the display assembly 2 and automatically change the displayed image, thereby improving user convenience.

As is apparent from the above, according to a display apparatus of the disclosure, a display assembly can be disposed as one of a plurality of mounting modes depending on a selection of a user by using a pair of stands.

Further, according to the display apparatus of the disclosure, an appropriate input source corresponding to each mounting mode can be automatically converted, so that user convenience can be improved.

The embodiments disclosed with reference to the accompanying drawings have been described above. However, it will be understood by those skilled in the art that various changes in form and details may be made therein without departing from the spirit and scope of the disclosure as defined by the appended claims.

What is claimed is:

1. A display apparatus comprising:
a display assembly comprising a screen configured to display an image; and
a plurality of stands connected to the display assembly to support the display assembly;
wherein each of the plurality of stands comprises a support bar extending in a front-rear direction, a leg extending upward from the support bar, and a plurality of coupling parts provided on the leg and arranged in the front-rear direction,
wherein the leg is fixed with respect to the support bar,
wherein the display assembly further comprises a first hook coupling portion, a second hook coupling portion, and a screw fastening portion provided on a rear surface of the display assembly,
wherein the first hook coupling portion and the second hook coupling portion are at a first distance and a second distance from the screw fastening portion,
wherein the first hook coupling portion and the second hook coupling portion are at a lateral direction and a perpendicular direction to the long side of the display assembly, and
wherein the display assembly is connected to one of the plurality of coupling parts.

2. The display apparatus according to claim 1, wherein:
each of the plurality of coupling parts comprises a coupling surface on which the display assembly is disposed, and
the display assembly is disposed on a respective coupling surface such that the respective coupling surface and a screen of the display assembly are parallel to each other.

3. The display apparatus according to claim 2, wherein:
the plurality of coupling parts comprises a first coupling part comprising a first coupling surface provided on a first surface of the leg, and a second coupling part comprising a second coupling surface provided on a second surface of the leg and having an upper end inclined toward the first surface of the leg.

4. The display apparatus according to claim 3, wherein:
a rear surface of the display assembly is connected to the first coupling part and disposed on the first coupling surface, and
the screen of the display assembly is disposed vertically in the front-rear direction.

5. The display apparatus according to claim 3, wherein:
a rear surface of the display assembly is connected to the second coupling part and disposed on the second coupling surface, and
the screen of the display assembly is disposed such that an upper end of the screen is inclined downward.

6. The display apparatus according to claim 3, wherein:
the support bar comprises a central portion from which the leg extends, a first extension portion extending from a first end of the central portion, and a second extension portion extending from the a second end of the central portion and that is shorter than the first extension portion, and
the leg is formed such that an upper end of the leg is inclined in a direction in which the first extension portion extends.

7. The display apparatus according to claim 6, wherein:
the first coupling part is provided at an upper portion of the leg and is positioned above the first extension portion, and
the first extension portion protrudes toward a front of the display assembly when the display assembly is connected to the first coupling part.

8. The display apparatus according to claim 6, wherein:
the second coupling part is provided at an upper portion of the leg and is positioned above the central portion, and
the first extension portion protrudes toward the rear of the display assembly when the display assembly is connected to the second coupling part.

9. The display apparatus according to claim 3, wherein:
the first coupling part comprises a first hook provided on the first coupling surface and a first screw coupling portion provided on the first coupling surface, and
the second coupling part comprises a second hook provided on the second coupling surface and a second screw coupling portion provided on the second coupling surface.

10. The display apparatus according to claim 9, wherein:
the screw fastening portion provided on the rear surface of the display assembly connects with the first screw coupling portion or the second screw coupling portion.

11. The display apparatus according to claim 10, wherein:
the first hook coupling portion provided on the rear surface of the display assembly connects to the first hook, and the second hook coupling portion provided on the rear surface of the display assembly connects to the second hook.

12. The display apparatus according to claim 11, wherein: the first hook coupling portion is provided to be spaced apart from the screw fastening portion by the first distance in a direction perpendicular to the long side of the display assembly.

13. The display apparatus according to claim 12, wherein: the second hook coupling portion is provided to be spaced apart from the screw fastening portion by the second distance longer than the first distance in a direction perpendicular to the long side of the display assembly.

14. The display apparatus according to claim 13, wherein: the screw fastening portion, the first hook coupling portion, and the second hook coupling portion are arranged side by side in a direction perpendicular to the long side of the display assembly.

15. The display apparatus according to claim 11, wherein: the second hook coupling portion is disposed to be spaced apart from the screw fastening portion by the second distance in a direction perpendicular to a short side of the display assembly.

16. A display apparatus comprising:
a display assembly comprising a screen configured to display an image;
a plurality of stands connected to the display assembly to support the display assembly;
a sensor to detect a tilt of the display assembly; and
a controller configured to change an input source of an image output, to a television mode or a content mode, via the screen of the display assembly based on the tilt of the display assembly,
wherein each of the plurality of stands comprises a support bar extending in a front-rear direction, a leg extending upward from the support bar, and a plurality of coupling parts provided on the leg and arranged in the front-rear direction,
wherein the leg is fixed with respect to the support bar, and
wherein the display assembly is connected to one of the plurality of coupling parts.

17. The display apparatus according to claim 16, wherein:
the plurality of coupling parts comprises a first coupling part comprising a first coupling surface provided on a first surface of the leg perpendicular to a ground, and a second coupling part comprising a second coupling surface provided on a second surface of the leg and having an upper end inclined toward the first surface of the leg, and
the controller is further configured to change the input source to the television mode based on determining that the display assembly is connected to the first coupling part, and change the input source to the content mode for receiving preset content based on determining that the display assembly is connected to the second coupling part.

18. The display apparatus according to claim 17, wherein:
the controller is further configured to control the display assembly to display a list of the preset content based on determining that the display assembly is connected to the second coupling part.

19. The display apparatus according to claim 17, wherein:
the controller is further configured to change the input source to a phone mode for interworking with a user terminal based on determining that the display assembly is connected to the second coupling part and a short side of the display assembly is horizontal to a ground surface.

20. The display apparatus according to claim 17, wherein:
the controller is further configured to determine that the preset content is content having an aspect ratio in which a vertical side is larger than a horizontal side based on determining that the display assembly is connected to the second coupling part and a short side of the display assembly is horizontal to a ground surface.

\* \* \* \* \*